US012485439B2

(12) United States Patent
Juric

(10) Patent No.: US 12,485,439 B2
(45) Date of Patent: Dec. 2, 2025

(54) BACK-MOUNTED SPRAY APPARATUS

(71) Applicant: Invatech Power Equipment Inc., Vancouver (CA)

(72) Inventor: Rick Juric, Vancouver (CA)

(73) Assignee: Invatech Power Equipment Inc., Vancouver (CA)

( * ) Notice: Subject to any disclaimer, the term of this patent is extended or adjusted under 35 U.S.C. 154(b) by 530 days.

(21) Appl. No.: 17/885,592

(22) Filed: Aug. 11, 2022

(65) Prior Publication Data

US 2023/0076948 A1 Mar. 9, 2023

Related U.S. Application Data

(60) Provisional application No. 63/232,086, filed on Aug. 11, 2021.

(51) Int. Cl.
*B05B 7/24* (2006.01)
*B29C 49/06* (2006.01)
(Continued)

(52) U.S. Cl.
CPC .......... *B05B 7/2475* (2013.01); *B05B 7/2408* (2013.01); *B29C 49/06* (2013.01);
(Continued)

(58) Field of Classification Search
CPC ... B05B 7/2475; B05B 7/2408; B05B 7/1427; B65D 5/46072; B65D 5/4608;
(Continued)

(56) References Cited

U.S. PATENT DOCUMENTS 3,901,449 A 8/1975 Bochmann
4,848,660 A 7/1989 O'Connell
(Continued)

FOREIGN PATENT DOCUMENTS

CN 2928267 Y 8/2007
DE 102007023409 A1 11/2008
(Continued)

*Primary Examiner* — Tuongminh N Pham
(74) *Attorney, Agent, or Firm* — Nicholas Garner; Oyen Wiggs Green & Mutala LLP

(57) ABSTRACT

A back-mounted spray apparatus includes a storage container shaped to receive therein liquid to be sprayed. The storage container includes a pair of side handles integrally formed therewith and a central handle therebetween and integrally formed therewith. Actuation of a spraying assembly of the apparatus causes the liquid from the storage container to be selectively sprayed outwards therefrom.
The storage container has a lower or front peripheral portion that is arc-shaped in a direction extending between sides thereof according to one aspect. The backpack sprayer includes a frame member extending along a rear thereof and to which the storage container couples. The frame member has an aperture extending therethrough which is arc-shaped. A horizontal frame member is cantilevered from a vertical frame member according to another aspect. The storage container has a lower portion within an inwardly-facing channel shaped to receive and couple to the horizontal frame member.

20 Claims, 29 Drawing Sheets

(51) Int. Cl.
*B29C 49/20* (2006.01)
*B29L 31/00* (2006.01)

(52) U.S. Cl.
CPC ...... *B29C 49/20* (2013.01); *B29C 2049/2039* (2013.01); *B29K 2023/06* (2013.01); *B29L 2031/712* (2013.01)

(58) Field of Classification Search
CPC .............. B65D 23/102; B65D 25/2885; B65D 25/2882; B65D 25/2897; B65D 2501/24535; A45F 3/10; A45F 3/166
See application file for complete search history.

(56) References Cited

U.S. PATENT DOCUMENTS

| | | |
|---|---|---|
| 5,478,015 A | 12/1995 | Black |
| 5,636,791 A | 6/1997 | Leer |
| 5,671,884 A | 9/1997 | Restive |
| 5,984,199 A | 11/1999 | Restive |
| 6,068,161 A * | 5/2000 | Soehnlen ............ B65D 25/2885 220/675 |
| 6,729,558 B1 * | 5/2004 | Seenauth ................ B05B 15/25 239/152 |
| 7,007,826 B2 | 3/2006 | Shapanus et al. |
| D731,027 S | 6/2015 | Sanz Perez |
| 9,358,563 B2 | 6/2016 | Kennemer et al. |
| 10,456,797 B2 | 10/2019 | Wiedmann |
| 10,562,052 B2 | 2/2020 | Fontaine |
| 10,625,284 B1 | 4/2020 | Gutekunst et al. |
| 2004/0056053 A1 * | 3/2004 | Hollander ............ B65D 23/104 222/466 |
| 2014/0209705 A1 | 7/2014 | Bähr et al. |
| 2018/0362227 A1 * | 12/2018 | Scanish .................... B65D 1/20 |
| 2021/0046494 A1 * | 2/2021 | Lam ...................... B05B 9/0888 |

FOREIGN PATENT DOCUMENTS

| | | | |
|---|---|---|---|
| JP | 2014135937 A | 7/2014 | |
| JP | 2016208888 A | 12/2016 | |
| WO | WO-2006087608 A2 * | 8/2006 | ............. A01G 20/47 |

* cited by examiner

BACK-MOUNTED SPRAY APPARATUS

BACKGROUND OF THE INVENTION

Field of the Invention

There is provided a spray apparatus. In particular, there is provided a back-mounted spray apparatus.

Description of the Related Art

United States Patent Application Publication No. 2021/0046494 to Lam discloses an electric power sprayer. The electric power spray has a battery system with a battery interface and a voltage transformer. The battery interface may receive a plurality of different batteries having different voltages. The voltage transformer is operatively-connected to the battery interface and converts the different voltages into a standard voltage.

U.S. Pat. No. 5,984,199 to Restive discloses a backpack sprayer comprising a supply tank, an expandable accumulator, a pump mechanism, an intake valve, a discharge valve, and a spray wand with a nozzle. The supply tank is designed to hold fluids, such as insecticides, herbicides, water sealants, etc. The expandable accumulator is preferably an elastomeric bladder, the function of which is to accumulate fluid from the supply tank under pressure. The volume of the bladder expands as pressurized fluid enters from the pump mechanism. As with most backpack sprayers, the pump mechanism is positioned adjacent to the bottom of the supply tank and is in fluid communication with the tank. The function of the pump mechanism is to pump fluid from the supply tank into the bladder. An intake valve, associated with an inlet opening of the bladder, enables a unidirectional flow of liquid from the pump to the bladder. Discharge of fluid from the bladder also occurs through the inlet opening upon the opening of a discharge valve. The discharge valve is normally closed to permit the bladder to accumulate a desired quantity of fluid. In the preferred embodiment, the discharge valve is hand-operated and located in a handle attached to a spray wand and nozzle. When the discharge valve is opened, the discharged fluid is directed from the accumulator and channeled through a hose, trigger handle, spray wand and spray nozzle.

Japanese Patent Reference No. 2014-135937 to Kosugi Shingo discloses a backpack type working machine. The machine includes a backpack type bush cutter formed by loading an engine, which is a drive source, on a backpack to be carried on the operator's back. The backpack includes a back surface part facing the operator's back. The backpack includes a base part extending from one end of the back surface part and loaded with the engine. The backpack includes a handle part extending from the another end of the back surface part. The backpack includes a tank for storing a fuel to be supplied to the engine. The tank extends integrally with the handle part in the same direction as the handle part and is arranged under the handle part.

U.S. Pat. No. 7,007,826 to Shapanus et al. discloses a portable fluid dispenser. The portable fluid dispenser has a tank, a pump coupled to the tank for pumping fluid therefrom, and a battery connected to the tank for powering the pump. The battery can be part of a removable battery pack received within an external receptacle of the tank. Some embodiments of the dispenser are adapted to be worn (such as in the form of a backpack), while others are adapted to be carried by a user. Also, in some embodiments a conduit extends through the tank in order to enable fluid to pass from the pump to another location with respect to the tank.

BRIEF SUMMARY OF INVENTION

There is provided, and it is an object to provide, an improved back-mounted spray apparatus, in this case a backpack sprayer.

There is accordingly provided a backpack sprayer according to a first aspect. The backpack sprayer includes a storage container shaped to receive therein liquid to be sprayed. The storage container includes a pair of side handles integrally formed therewith and a central handle therebetween and integrally formed therewith. The backpack sprayer includes a spraying assembly coupled to the storage container. Actuation of the spraying assembly causes the liquid from the storage container to be selectively sprayed outwards therefrom.

There is further provided a backpack sprayer according to a second aspect. The backpack sprayer includes a storage container shaped to receive therein liquid to be sprayed. The backpack sprayer includes a frame member extending along a rear thereof. The storage container couples to the frame member. The frame member includes a circular aperture extending therethrough.

There is also provided a back-mounted spray apparatus according to a third aspect. The apparatus includes a backrest. The apparatus includes a storage container shaped to receive therein liquid to be sprayed. The storage container couples to the backrest and includes a central handle integrally formed therewith and positioned between sides thereof. The central handle aligns with or is below the top of the storage container and extends rearward a distance equal to less than that of the backrest. The apparatus includes a spraying assembly coupled to the storage container, with actuation thereof causing the liquid from the storage container to be selectively sprayed outwards therefrom.

There is additionally provided a back-mounted spray apparatus according to a fourth aspect. The apparatus includes a storage container shaped to receive therein liquid to be sprayed. The storage container includes an outwardly concave recessed portion positioned between sides thereof. The storage container includes a central handle integrally formed therewith. The storage container includes a spraying assembly coupled to the storage container, with actuation thereof causing the liquid from the storage container to be selectively sprayed outwards therefrom.

There is yet also provided a back-mounted spray apparatus according to a fifth aspect. The apparatus includes a storage container shaped to receive therein liquid to be sprayed. The storage container includes a first handle integrally formed with a front thereof and a second central handle integrally formed with a rear thereof. The apparatus includes a spraying assembly coupled to the storage container, with actuation thereof causing the liquid from the storage container to be selectively sprayed outwards therefrom.

There is further provided a back-mounted spray apparatus according to a sixth aspect. The apparatus includes a storage container shaped to receive therein liquid to be sprayed. The storage container includes handle means integrally formed with and coupled thereto. The storage container includes a spraying assembly coupled to the storage container, with actuation thereof causing the liquid from the storage container to be selectively spray outwards therefrom.

There is yet further provided a back-mounted spray apparatus according to a seventh aspect. The apparatus includes a storage container shaped to receive therein liquid to be sprayed. The storage container includes at least one central handle integrally formed with the top thereof adjacent to one of a front or rear thereof. The apparatus includes a spraying assembly coupled to the storage container, with actuation thereof causing the liquid from the storage container to be selectively sprayed outwards therefrom.

There is yet additionally provided a back-mounted spray apparatus according to an eighth aspect. The apparatus includes a storage container shaped to receive therein liquid to be sprayed. The storage container includes a pair of side handles integrally formed with respective sides thereof. The storage container includes a pair of arc-shaped portions each enclosing a respective said side handle. The apparatus includes a spraying assembly coupled to the storage container, with actuation thereof causing the liquid from the storage container to be selectively sprayed outwards therefrom There is also provided a backpack sprayer according to a ninth aspect. The backpack sprayer includes a storage container shaped to receive therein liquid to be sprayed. The storage container has a lower or front peripheral portion that is arc-shaped in a direction extending between sides thereof. The backpack sprayer includes a frame member extending along a rear thereof. The storage container couples to the frame member. The frame member has an aperture extending therethrough which is arc-shaped at least in part.

There is further provided a backpack sprayer according to a tenth aspect. The backpack sprayer includes a frame comprising one or more vertical members and one or more horizontal members coupled to and cantilevered from the one or more vertical members. The backpack sprayer includes a storage container shaped to receive therein liquid to be sprayed. The storage container has a lower portion within an inwardly-facing channel shaped to receive and couple to the one or more horizontal members of the frame.

There is yet also provided a backpack sprayer according to an eleventh aspect. The backpack sprayer includes a storage container shaped to receive therein liquid to be sprayed. The storage container includes a front and a rear spaced-apart from the front thereof. The storage container includes first and second sides extending between the front thereof and the rear thereof. The storage container includes a first angled surface extending between the first side thereof and the front thereof. The storage container includes a second angled surface extending between the second side thereof and the front thereof. The storage container includes a third angled surface extending between the first side thereof and the rear thereof. The storage container includes a fourth angled surface extending between the second side thereof and the rear thereof. The backpack sprayer includes a spraying assembly coupled to the storage container. Actuation of the spraying assembly causes the liquid from the storage container to be selectively spray outwards therefrom.

There is yet further provided a storage container for one or more of the above set out backpack sprayers.

There is provided a method of forming a storage container for a back-mounted spray apparatus. The method includes forming a handle via a handle mold. The method includes enclosing the handle so formed within a block assembly having one or more exterior surfaces which are outwardly convex. The method includes positioning the block assembly within a container mold. The method includes blow injecting material into the container mold.

It is emphasized that the invention relates to all combinations of the above features, even if these are recited in different claims.

Further aspects and example embodiments are illustrated in the accompanying drawings and/or described in the following description.

BRIEF DESCRIPTION OF DRAWINGS

The accompanying drawings illustrate non-limiting example embodiments of the invention.

DESCRIPTION OF THE PREFERRED EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
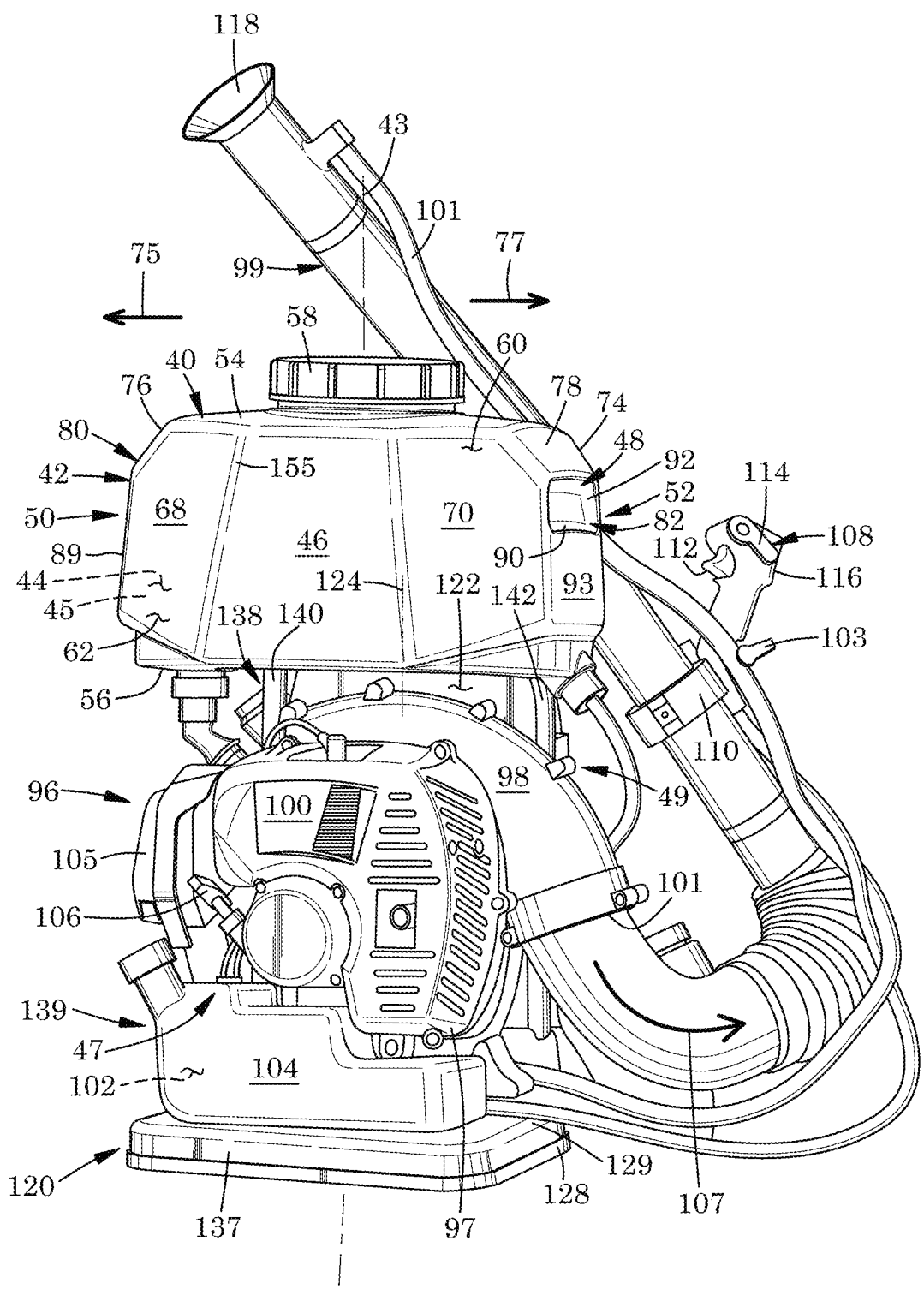
FIG. 1 is a front, left side perspective view of a backpack sprayer according to a first aspect, the backpack sprayer including a storage container, a carrier frame assembly to which the storage container couples via an upper portion thereof, and a blower unit which couples to a lower portion of the carrier frame assembly.

Referring to the drawings and first to FIG. 1, there is shown a back-mounted spray apparatus, in this example a backpack sprayer 40. The backpack sprayer has a front 47 and a rear 49 opposite the front thereof.

The backpack sprayer 40 includes a storage container 42. The storage container may be referred to as a supply tank or liquid reservoir. Storage container 42 is made a chemically-resistant material, in this example a plastic, in this case polyethylene. However, this is not strictly required and the storage container may be made of other materials in other examples. Storage container 42 is shaped to receive therein a medium to be sprayed, in this example liquid 44 stored within an interior 45 thereof. The liquid may be an insecticide, herbicide, fungicide, pesticide or other such chemical composition.

Figure 2:
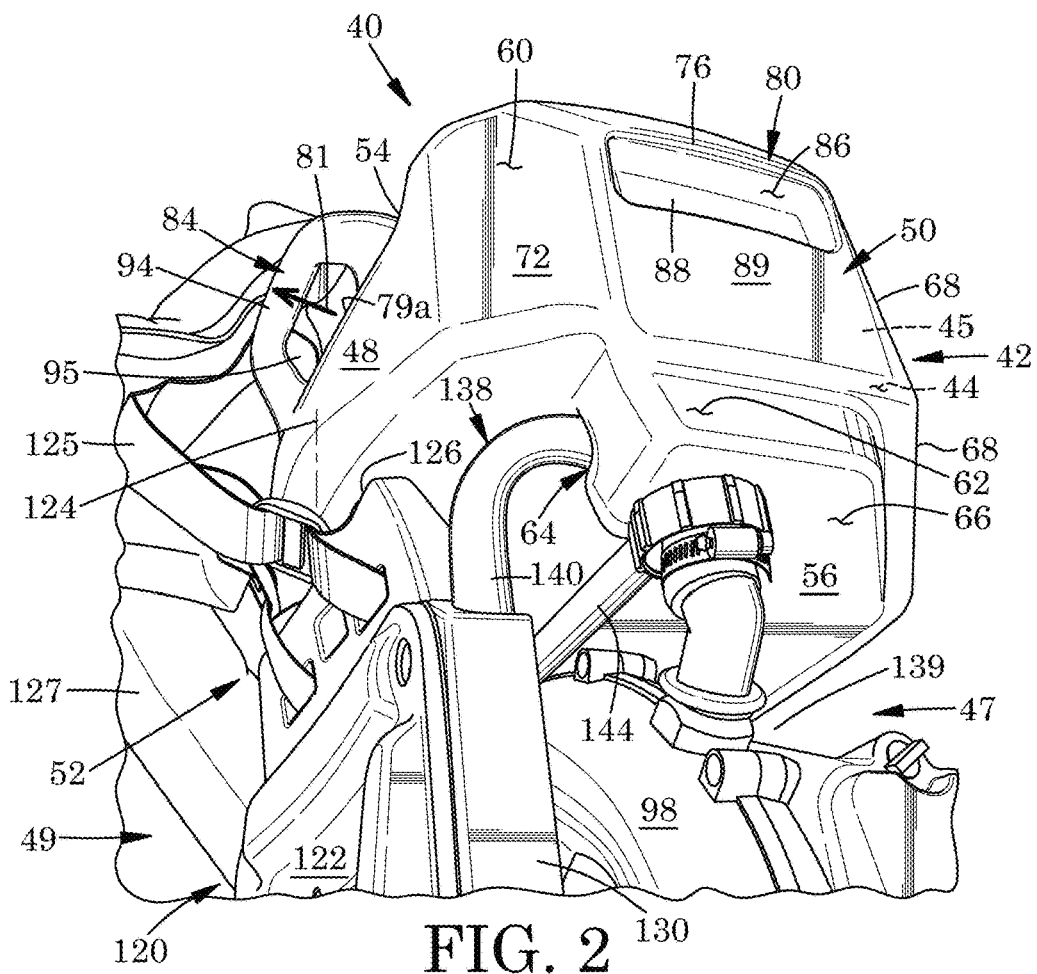
FIG. 2 is a right side, bottom, rear perspective view of the storage container and an upper portion of the carrier frame assembly of the backpack sprayer of FIG. 1, with the rest of the backpack sprayer being shown in fragment.

As seen in FIG. 1, storage container 42 has a front 46 aligned with front 47 of backpack sprayer 40. The front of the storage container is an isosceles trapezoid in shape in this example; however this is not strictly required. Referring to FIG. 2, the storage container has a rear 48 spaced-apart from the front thereof and aligned with rear 49 of storage container 42. The storage container has a first or right side 50 and a second or left side 52 (seen in FIG. 1) extending between front 46 thereof and the rear thereof. As seen in FIG. 1, front 46 and rear 48 of storage container 42 extend between the sides of the storage container.

Figure 4:
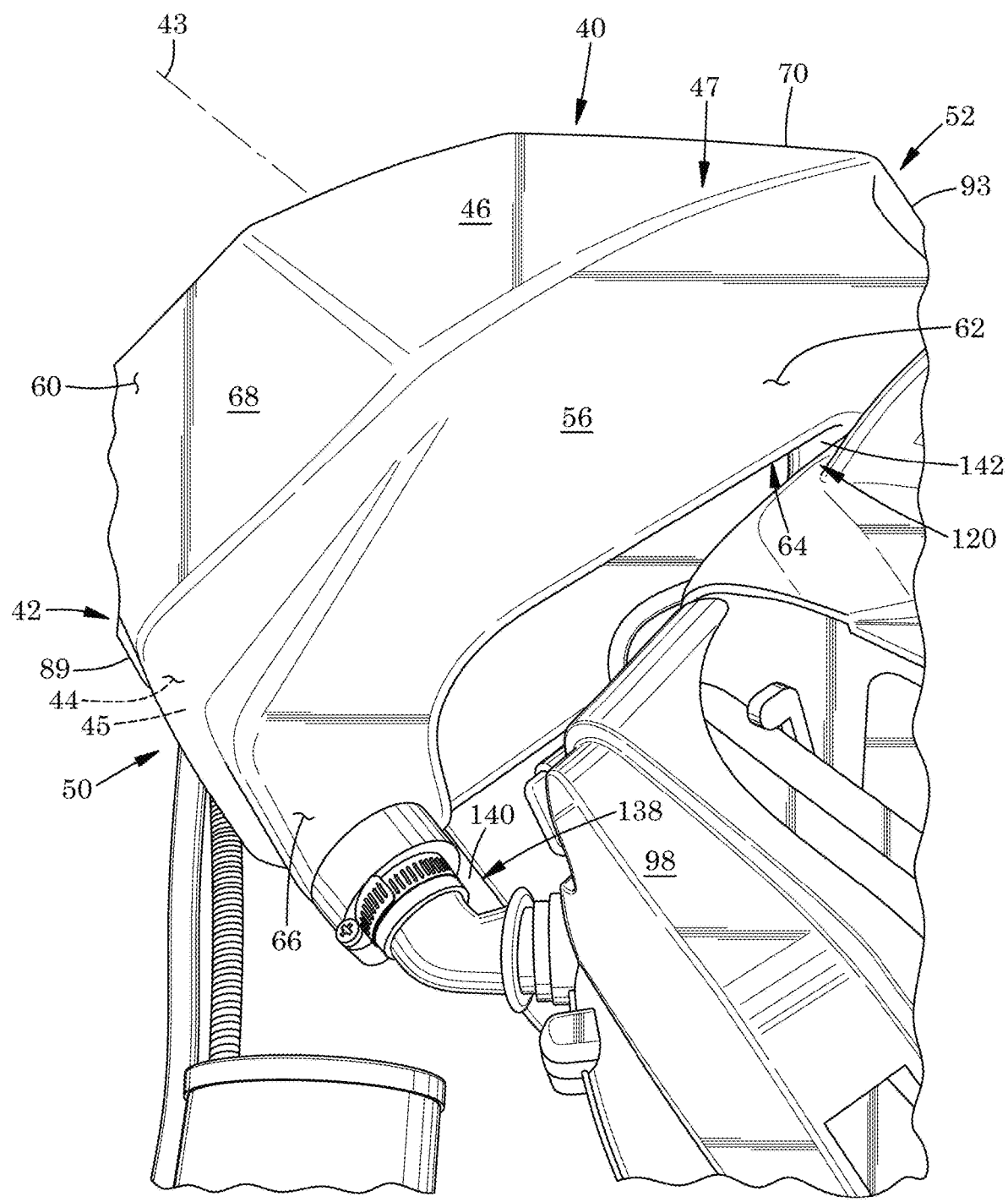
FIG. 4 is a front, bottom perspective view thereof shown in fragment.

Storage container 42 has a top 54 and a bottom 56 spaced-apart from the top thereof. The top and bottom of storage container 42 extend between sides 50 and 52 of the storage container and extend between front 46 and rear 48 of the storage container. Referring to FIGS. 2 and 4, the storage container is octagonal in top profile in this example; however, this is not strictly required. As seen in FIG. 1, storage container 42 includes a removable lid 58 threadably coupled to top 54 thereof and via which liquid 44 is insertable into the storage container.

The storage container includes an upper portion 60 that extends from top 54 thereof towards bottom 56 thereof. As seen in FIG. 4, the storage container includes a lower portion 62 that extends from the bottom thereof towards the top thereof. The lower portion of storage container 42 is coupled to and integrally formed with upper portion 60 of the storage container in this example.

Referring to FIG. 2, lower portion 62 of the storage container has an inwardly-facing channel 64 in this example.

Storage container 42 includes a peripheral portion, in this example a lower peripheral portion 66 extending from bottom 56 towards top 54 thereof. The lower peripheral portion may be referred to a front peripheral portion of the storage container. As seen in FIG. 4, the bottom, the lower peripheral portion, and lower portion 62 of the storage container are u-shaped in bottom profile in this example.

As seen in FIG. 1, backpack sprayer 40 has a longitudinal axis 43. Storage container 42 is symmetrical about the longitudinal axis in this example. The storage container includes a first angled surface 68 in this example extending between right side 50 thereof and front 46 thereof. Storage container 42 includes a second angled surface 70 in this example extending between left side 52 thereof and the front thereof. As seen in FIG. 2, the storage container includes a third angled surface 72 in this example extending between right side 50 thereof and rear 48 thereof. As seen in FIG. 4, storage container 42 includes a fourth angled surface 74 extending between left side 52 thereof and the rear thereof.

Figure 3:
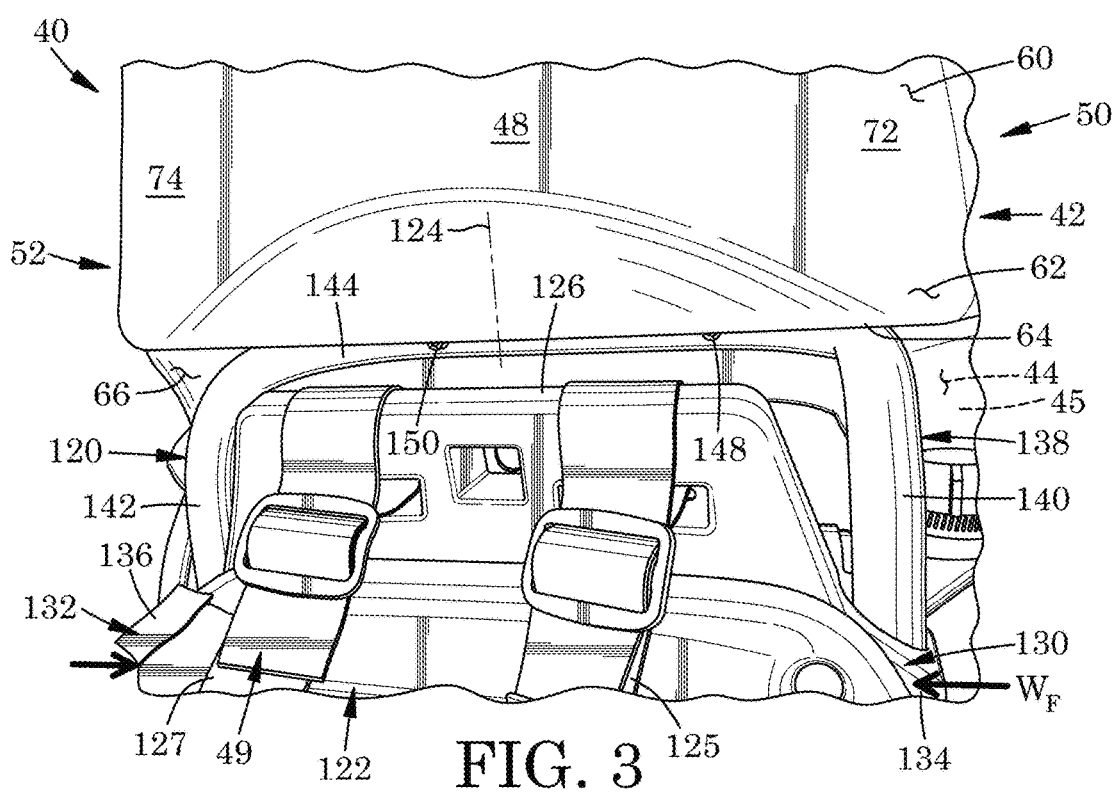
FIG. 3 is a rear perspective view thereof shown in fragment.

Referring to FIGS. 1 and 3, first angled surface 68, second angled surface 70, third angled surface 72 and fourth angled surface 74 of the storage container are each substantially the same in shape in this example. The first angled surface, second angled surface, third angled surface and fourth angled surface of storage container 42 are generally planar and isosceles trapezoids in shape in this example. First angled surface 68 and third angled surface 72 of the storage container seen in FIGS. 1 and 2 taper in a first direction 75 seen in FIG. 1 outwards from longitudinal axis 43 of backpack sprayer 40 in this embodiment; however this is not strictly required. Second angled surface 70 and fourth angled surface 74 of storage container 42 seen in FIGS. 1 and 3 taper in a second direction 77 outwards from the longitudinal axis of the backpack sprayer in this embodiment; however here too this is not strictly required.

As seen in FIG. 1, the storage container includes fifth angled surface 76 in this example extending between top 54 thereof and right side 50 thereof. As seen with reference to FIGS. 1 and 2, the fifth angled surface of the storage container tapers from the top of the storage container towards right side 50 of the storage container.

Referring to FIG. 1, storage container 42 includes a sixth angled surface 78 in this example extending between top 54 thereof and left side 52 thereof. The sixth angled surface of storage container 42 tapers from the top of the storage container towards left side 52 of the storage container. Fifth angled surface 76 and sixth angled surface 78 are substantially the same in shape in this example, in this case being generally planar and isosceles trapezoids in shape; however this is not strictly required. As seen in FIG. 1, storage container 42 thus tapers in directions 75 and 77 extending from longitudinal axis 43 of backpack sprayer 40 towards sides 50 and 52 thereof in this example.

Figure 8:
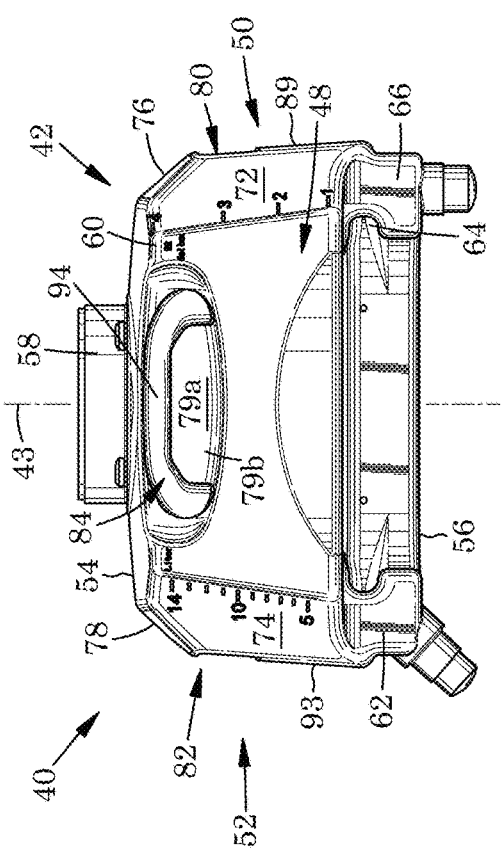
FIG. 8 is a rear elevation view of the storage container of the backpack sprayer of FIG. 1.

As seen in FIG. 2, the storage container includes a seventh angled surface 79a in this example extending between top 54 thereof and rear 48 thereof. The seventh angled surface is positioned between sides 50 and 52 of storage container 42. Seventh angled surface 79a of storage container 42 is outwardly concave in this example. As seen in FIG. 8, the storage container has a lower angled surface 79b adjacent to and which extends at an angle relative to angled surface 79a; however this is not strictly required. Angled surface 79b of storage container 42 is also outwardly concave in this example.

As seen with reference to FIGS. 8 to 11, storage container 42 tapers at least in part from longitudinal axis 43 towards sides 50 and 52 thereof in this example. The storage container also in this example tapers at least in part from bottom 56 thereof towards top 54 thereof.

Referring to FIG. 1, the storage container includes a plurality of container-carrying handles, in this example a pair of side handles 80 and 82 and central handle 84 seen in FIG. 2 and positioned between the side handles. The central handle may be referred to as a centrally-positioned handle. Handles 80, 82 and 84 of storage container 42 are rigidly coupled together and formed therewith. The handles are integrally connected to and formed with the storage container so as to form a unitary whole in this example. Each of handles 80, 82 and 84 of the storage containers as herein described and shown in FIGS. 1 to 52 may individually or collectively be referred to as handle means.

As seen in FIG. 2, right side handle 80 of storage container 42 is integrally formed with right side 50 of the storage container. The right side handle of the storage container is formed by the right side, first angled surface 68, third angled surface 72 and fifth angled surface 76 of the storage container in this example; however, this is not strictly required. The fifth angled surface of storage container 42 may be referred to as an upper member of right side handle 80 of the storage container.

The right side handle of the storage container includes a receptacle 86. The receptacle is shaped to selectively receive a hand at least partially therein and may be referred to as a hand-receiving receptacle. Receptacle 86 tapers in a direction extending from top 54 of storage container 42 towards right side 50 of storage container 42 in this example. Right side handle 80 of the storage container has an opening 88 in fluid communication with the receptacle thereof. The opening is rectangular in profile in this example and shaped to receive a first hand (not shown) at least partially therethrough. Fifth angled surface 76 of storage container 42 extends from opening 88 of the right side handle outwards towards top 54 of the storage container. Storage container 42 has a first side surface 89 extending along side 50 thereof below the opening of right side handle 80 in this example. The first side surface of the storage container is generally planar and rectangular in this example, though this is not strictly required.

As seen in FIG. 1, left side handle 82 of storage container 42 is integrally formed with left side 52 of the storage container. The left side handle of the storage container is formed by the left side, second angled surface 70, fourth angled surface 74 and sixth angled surface 78 of storage container 42 in this example. The sixth angled surface of the storage container may be referred to as an upper member of left side handle 82.

Left side handle 82 of storage container 42 includes a receptacle 90. The receptacle is shaped to selectively receive a hand at least partially therein and may be referred to as a hand-receiving receptacle. Receptacle 90 tapers in a direction extending from top 54 of storage container 42 towards left side 52 of the storage container in this example. Left side handle 82 of the storage container has an opening 92 in fluid communication with the receptacle thereof. The opening is rectangular in profile in this example and shaped to receive a second hand (not shown) at least partially therethrough. Sixth angled surface 78 of storage container 42 extends from opening 92 of left side handle 82 outwards towards top 54 of the storage container. The storage container has a second side surface 93 extending along side 52 thereof and positioned below the opening of the left side handle. The second side surface is generally planar and rectangular in this example, though this is not strictly required. Left side handle 82 and right side handle 80 of storage container 42 are substantially mirror images of each other and otherwise substantially similar in shape in this example.

Figure 9:
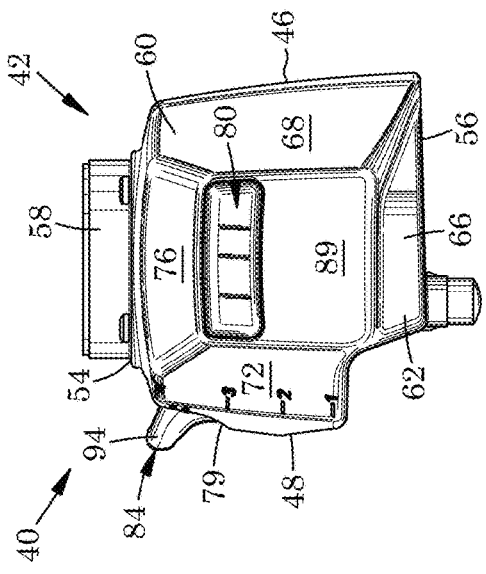
FIG. 9 is a right side elevation view thereof.

As seen in FIG. 2, central handle 84 of storage container 42 is positioned between the side handles and sides 50 and 52 of the storage container. The central handle of the storage container is positioned rearwards of side handles 80 of the storage container in this example. Central handle 84 of storage container 42 couples to and is integrally formed with top 54 and rear 48 of the storage container in this example. The central handle of the storage container extends outwards in part and upwards in part relative to the storage container in this example. Referring to FIG. 9, central handle 84 of storage container 42 is positioned level with or below top 54 of storage container 42. The central handle of the storage container extends substantially perpendicular to side handles 80 of the storage container in this example. Central handle 84 of storage container 42 is fixed relative to positioning of side handles 80 of the storage container.

Still referring to FIG. 2, the central handle of the storage container includes a base, in this example seventh angled surface 79a of the storage container. Central handle 84 of storage container 42 includes an elongate outer member 94 shaped to be gripped by one's hand. Seventh angled surface 79a of the storage container faces the elongate outer member of the central handle. Elongate outer member 94 of central handle 84 of storage container 42 extends perpendicular to sides 50 and 52 and side handles 80 of the storage container. The central handle of the storage container tapers in a direction 81 extending from seventh angled surface 79a of storage container 42 to elongate outer member 94. The elongate outer member of central handle 84 is integrally connected to and formed with storage container 42 so as to form a unitary whole in this example. The central handle of the storage container has an opening 95 formed by seventh angled surface 79a of storage container 42 and elongate outer member 94 of the central handle. The opening is shaped to fit one's hand at least partially therethrough when gripping the elongate outer member.

Figure 5:
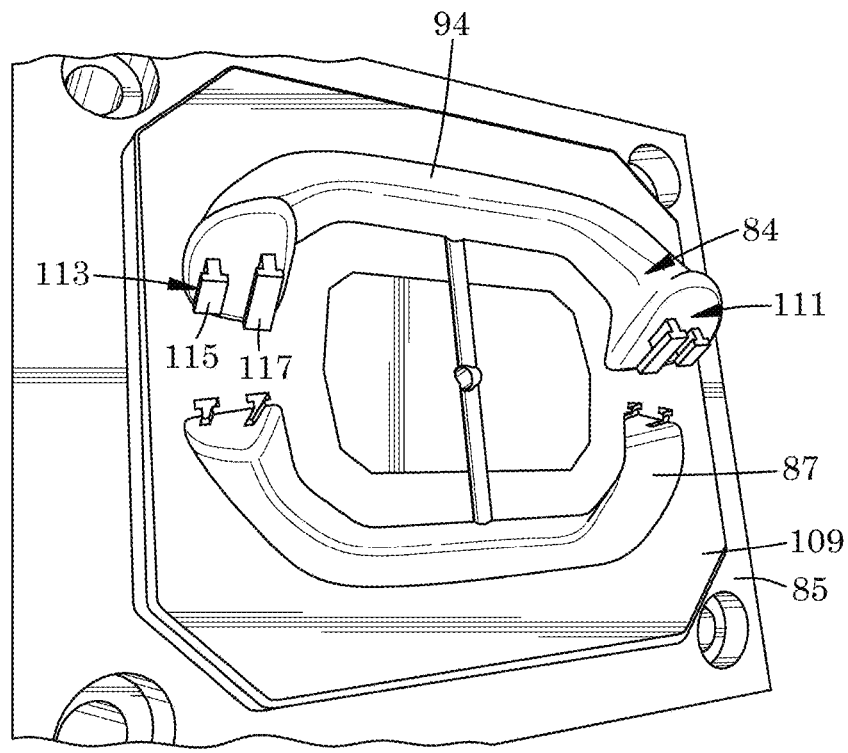
FIG. 5 is a top perspective view of a half portion of a handle mold, together with a central handle formed therefrom, the handle being for the storage container of FIG. 1.
Figure 6:
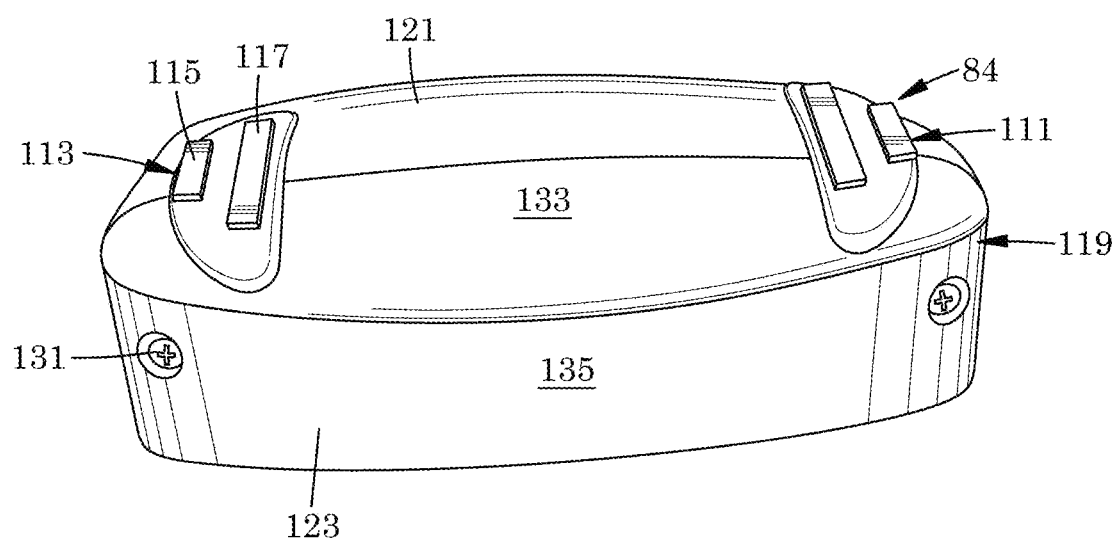
FIG. 6 is a rear, bottom perspective view of a block assembly enclosing the central handle of FIG. 5, with end portions of the handle extending outwards at least in part from the block assembly.

As seen in FIG. 5, central handle 84 is first formed by injection molding in this example. A first or handle mold 109 is pressed together, only one half portion 85 of which is shown in FIG. 5, with the other half portion being generally a mirror image thereof. The handle mold in this case is configured to make two handles 84. Handle mold 109 has interior 87 comprising a mirror image of the handle shape. Material such as a meltable polymer, in this example heated liquid plastic is injected into the molds and the material is thereafter cooled to form the handles. Each central handle 84 includes a pair of spaced-apart end portions 111 and 113. The central handle is thus generally c-shaped. One or more protrusions extend outwards from each end portion of central handle 84, in this example in the form of a pair of spaced-apart tabs as seen in FIG. 6 by tabs 115 and 117 of end portion 113.

Central handle 84 is then enclosed by a block assembly 119. The block assembly comprises two halves portions 121 and 123 that are coupled together via fasteners, in this example screws 131. Block assembly 119 has a first exterior surface 133 extending between end portions 111 and 113 of handle 84. The first exterior surface of block assembly 119 is outwardly convex and mirrors seventh angled surface 79a of the storage container seen in FIG. 8. Referring back to FIG. 6, the block assembly includes a second exterior surface 135 coupled to and extending outwards at angle relative to first exterior surface 133 thereof. The second exterior surface of block assembly 119 is outwardly convex and mirrors lower angled surface 79b of the storage container seen in FIG. 8.

Figure 7:
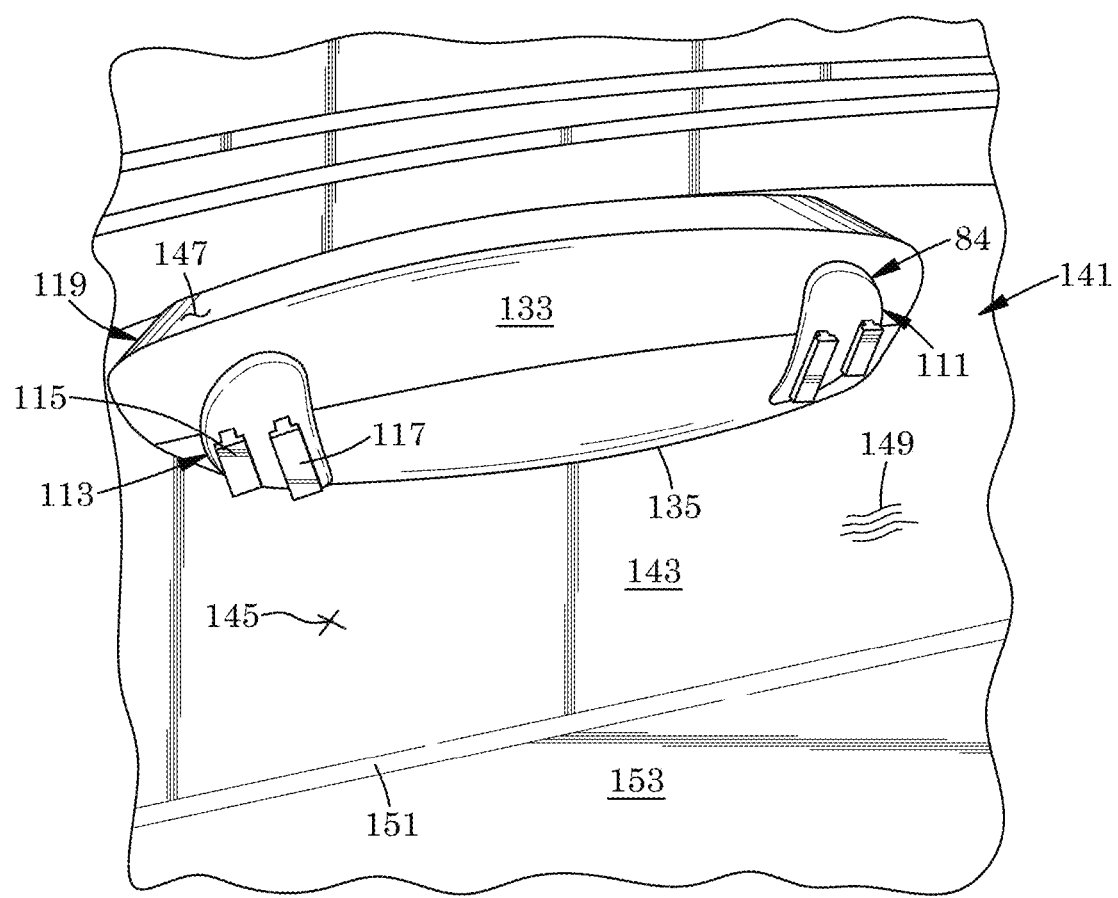
FIG. 7 is an interior perspective view of a container mold for the storage container of FIG. 1, together with the block assembly and handle of FIG. 6 positioned within the container mold.

As seen in FIG. 7, a second or container mold 141 is provided which mirrors upper portion 60 and lower portion 62 and side handles 80 and 82 of storage container 42 seen in FIG. 1. Referring back to FIG. 7, block assembly 119, with handle 84 enclosed therein, is positioned within the container mold along surface 143 of the container mold. Surface 143 mirrors rear 48 of storage container 42 seen in FIG. 8 at a location adjacent to where top 54 of the storage container is formed, in this example. Referring back to FIG. 7, material 149 is next blow mold injected into container mold 141 so as to coat interior 145 of the container mold and exterior 147 of block assembly 119.

Tabs 115 and 117 of end portions 111 and 113 of central handle 84 melt and bond with the rest of the material being injected therein during this process. The central handle thereby couples to and is integrally formed with the rest of the material now shaped in the form of storage container 42 seen in FIG. 1. Central handle 84 is sealed to the rest of the storage container thereby. The central handle is thus joined to the rest of storage container 42 while positioned within container mold 141. Block assembly 119 may be unscrewed and removed from central handle 84 thereafter.

There is thus provided a method of forming storage container 42 seen in FIG. 1 for backpack sprayer 40. The method includes forming central handle 84 seen in FIG. 5 via handle mold 109. The central handle is formed to include spaced-apart end portions 111 and 113 and elongate outer member 94 extending therebetween.

As seen in FIG. 6, the method includes enclosing handle 84 so formed within block assembly 119. The method includes providing the block assembly with one or more exterior surfaces 133 and 135 that are outwardly convex. The one or more exterior surfaces of the block assembly extend between end portions 111 and 113 of the handle. The end portions of handle 84 extend at least in part outwards from block assembly 119, in this example outwards from exterior surface 133 of the block assembly.

Figure 11:
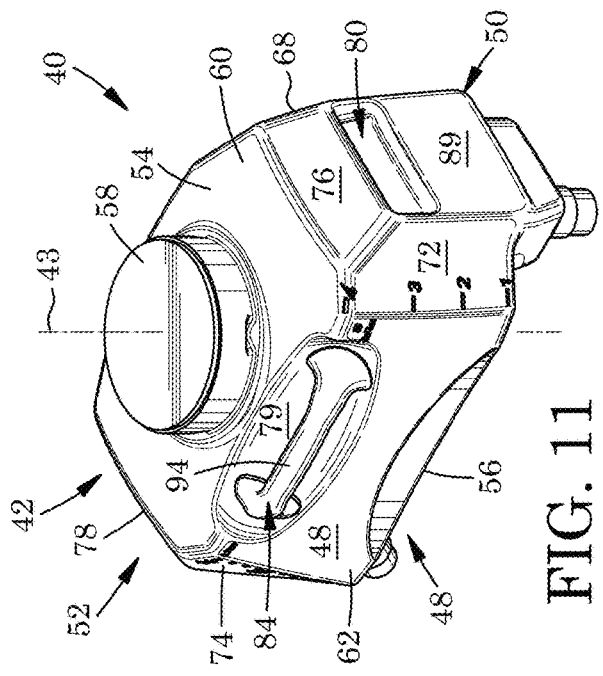
FIG. 11 is a top, rear, right side perspective view thereof.
Figure 10:
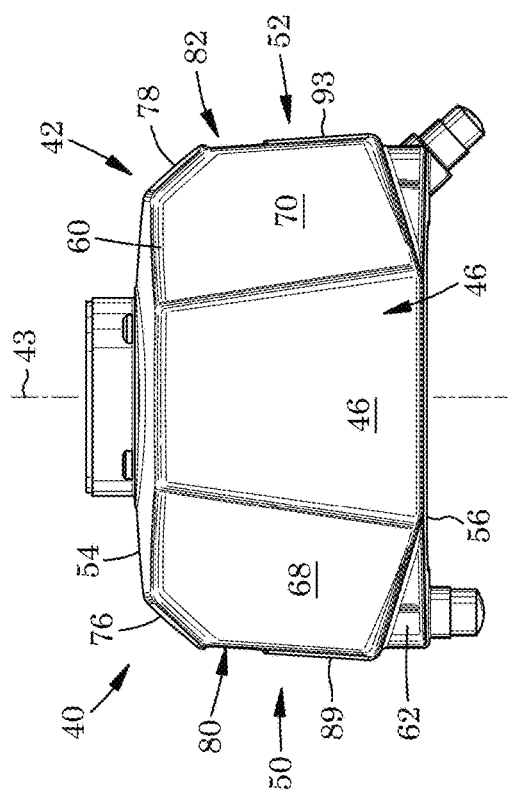
FIG. 10 is a front elevation view thereof.

Referring to FIG. 7, the method includes positioning the block assembly within container mold 141. The method includes blow injecting heated material 149 into the container mold so as to coat interior surfaces 143 thereof and exterior surfaces 133 and 135 of block assembly 119. End portions 111 and 113 of handle 84, including in this example tabs 115 and 117 thereof, melt to and integrally couple with the material so injected during the blow injecting step. Referring to FIG. 11, one or more concave shapes shown by surfaces 79a and 79b are formed in storage container 42 via block assembly 119. Injection blowing molding per se is known to those skilled in the art and will not be described in further detail.

The method of forming storage container 42 as described herein may result in many advantages. Referring to FIG. 7, block assembly 119, with end portions 111 and 113 of central handle 84 extending outwards therefrom and melting with material 149 within container mold 141, may result in a central handle that better couples together with the rest of the storage container in a repeatable, strengthened manner. The concave shape as shown by surfaces 79a and 79b of storage container 42 seen in FIG. 11, and formed by block assembly 119 seen in FIG. 6, may strength of the storage container. The concave shape adjacent central handle 84 may also function to inhibit the blow mold from breaking at side handles 80 and 82 thereof seen in FIGS. 8 and 9 when the storage container is removed from mold 141 seen in FIG. 7 for example.

Block assembly 119 and the method as herein described, with exterior surfaces 133 and 135 of the block assembly seen in FIG. 7, may facilitate material flow during the injection process while also facilitating a relatively quick release of the material from mold 141 thereafter. This may be advantageous because if the material remains in the mold for too long, handles 84, 80 and/or 82 seen in FIGS. 8 and 9 have a greater prospect of breaking, including breaking free from the rest of storage container 42 seen in FIG. 1. This may result in a storage container that is damaged and/or with one more holes extending therein. Referring back to FIG. 7, the reduction in time of material 149 within mold 141 resulting from the above process may also result in an increase in manufacturing productivity.

Block assembly 119 may further provide the advantage of reducing the overall size of container mold 141, which may reduce mold costs and provide an economy of scale.

The concave shape formed by surfaces 79*a* and 79*b* in FIG. 11, and formed by block assembly 119 seen in FIG. 6, may further function to hide central handle 84 in part and/or inhibit the extent to which the central handle extends outwards from the rest of storage container 42 as seen in FIG. 9. The central handle is configured to align with and/or is positioned below top 54 of storage container 42. As seen in FIG. 2, the central handle is configured to align with and/or be inwardly spaced from rear 49 of backpack sprayer 40. As seen in FIG. 8, side handles 80 and 82 align with and/or are inwardly set relative to sides 50 and 52, respectively. The method and storage container 42 as herein described, with central handle 84 so positioned and shaped, together with the streamline side handles 80 and 82 seen in FIGS. 8 and 9, may facilitate selective gripping and raising of backpack sprayer 40 on the one hand, while also on the other hand resulting in a storage container that may be more compact with reduced dimensions per unit, thereby reducing shipping costs.

Referring to FIG. 11, the overall shape of storage container 42 and its side handles 80 and 82 thereof may further facilitate the manufacturing of backpack sprayer 40. The tapering of the storage container towards sides 50 and 52 thereof may facilitate the popping off of the side handles of the storage container so formed from container mold 141 seen in FIG. 7. This may thus enable storage container 42 seen in FIG. 8 to be removed from the container mold within a reduced amount of time. This may be advantageous because as discussed above if material 149 seen in FIG. 7 couples to container mold 141 for too long a time period, side handles 80 and 82 seen in FIG. 1 may peal off from the rest of storage container 42, resulting in holes therewithin.

Still referring to FIG. 7, peripheral edge portions 151 between adjacent surfaces 143 and 153 of mold 141 are beveled in this example. The peripheral edge portions of the mold so shaped may further facilitate the removal of the storage container 42 seen in FIG. 1 from the mold in a time efficient and repeatable manner. Beveled edge portions 151 of mold 141 seen in FIG. 7 result in rounded the storage container having rounded corners 155.

As seen in FIG. 1, backpack sprayer 40 includes a spraying assembly, in this example a blower unit 96. The blower unit includes a liquid suction unit, in this example a fan unit 98. However, this is not strictly required and a pump unit may be used in other embodiments, for example. Fan unit 98 is positioned adjacent to bottom 56 of storage container 42 in this example. Backpack sprayer includes an outlet conduit, in this example a blower unit conduit, in this case a blower unit pipe 99 coupled to the output of fan unit 98. The blower unit pipe may be referred to as an outlet pipe. Fan unit 98 provides an air stream 107 which is directed through blower unit pipe 99. Backpack sprayer 40 includes a spraying medium line 101 in fluid communication with liquid 44 within interior 45 of storage container 42. The liquid is selectively fed to air stream 107 created by fan unit 98 via the spraying medium line. Spraying medium line 101 has a valve 103 actuation of which controls the extent to which liquid 44 flows therethrough.

Blower unit 96 includes a housing 97 coupled to and adjacent fan unit 98 in this example. The housing includes a filter cover 105 that is selectively removable for cleaning an air filter (not shown) therewithin.

Blower unit 96 includes a drive motor, in this example comprising a two-stroke or four-stroke internal combustion engine 100. However, this is not strictly required and the motor may be an electric motor in other embodiments. Engine 100 is positioned within housing 97. The engine operates via an energy source, in this example fuel 102 stored within a fuel container 104. The fuel container is positioned adjacent to the engine in this example; however, this is not strictly required and the engine or motor may be battery powered, such as lithium battery powered, in other embodiments for example. Engine 100 operatively connects to and selectively operates/actuates fan unit 98 in this example. The engine includes a starter, in this example a pull-rope starter 106, with outwards pulling thereof functioning to start the engine.

Still referring to FIG. 1, blower unit 96 includes a gripping handle 108 coupled to blower unit pipe 99 via a collar 110. The gripping handle includes a power or gas lever 112, a stop switch 114 and an operating lever 116. In operation, when engine 100 is started via pull-rope starter 106, actuation of the gas lever and operating lever causes the engine to drive or actuate fan unit 98. Actuation of the fan unit causes the fan unit to generate air stream 107 through blower unit 96 and blower unit pipe 99. With valve 103 in an at least partially open position, liquid 44 passing from storage container 42 and through spraying medium line 101 mixes with the air stream and exits from outlet 118 of blower unit pipe 99 in spray form. Blower units per se, including their various parts and functionings, are well known to those skilled in the art and blower unit 96 will thus not be described in further detail.

As seen in FIG. 2, backpack sprayer 40 includes a carrier frame assembly 120. The frame assembly includes a frame member 122 extending along rear 49 thereof. The frame member is planar in this example and generally rectangular in shape; however, this is not strictly required. Frame member 122 has a longitudinal axis 124 extending from a top 126 thereof seen in FIG. 3 towards a bottom 128 thereof seen in FIG. 1. The longitudinal axis of the frame member extends parallel to longitudinal axis 43 of backpack sprayer 40 seen in FIG. 1 in this example.

As seen in FIG. 3, the backpack sprayer includes a pair of spaced-apart, length-adjustable backpack straps 125 and 127 coupled to top 126 of frame member 122. The operator (not shown) of backpack sprayer 40 extends his or her arms through the backpack straps, with the backpack straps thereafter resting on the respective shoulders of the operator. Backpack straps 125 and 127 thus enable backpack sprayer 40 to be back-mounted, with frame member 122 being shaped in this example to extend along/adjacent and/or abut the back of the operator (not shown). As seen in FIG. 2, central handle 84 is positioned to align with and/or be inwardly positioned relative to the frame member of carrier frame assembly 120 in this example.

As seen in FIG. 1, frame member 122 includes a lower peripheral portion 129 extending along bottom 128 thereof. As seen in FIG. 3, the frame member has a width $W_F$ extending between sides 130 and 132 thereof. The frame member has a pair of spaced-apart side peripheral portions 134 and 136 extending along the sides thereof.

Referring to FIG. 1, carrier frame assembly 120 further includes a base member, in this example a horizontal member, in this case in the form of a horizontally-extending stand 137. The stand is generally planar and rectangular in top profile in this example, though this is not strictly required. Stand 137 couples to and extends outwards from frame member 122 of carrier frame assembly 120. The stand in this example is cantilevered to and extends perpendicularly outwards from the frame member of the carrier frame assembly. Stand 137 and storage container 42 form a C-shape in side profile with an opening 139 therebetween in this example. The stand and storage container are thus shaped in this example to receive fuel container 104, engine 100 and fan unit 98 of blower unit 96 therebetween. The fuel container, engine and fan unit of the blower unit operatively couple to carrier frame assembly 120. Fuel container 104, engine 100 and fan unit 98 of blower unit 96 are supported by and received on stand 137 in this example. The engine and fan unit are also supported in part and couple to frame member 122 in this example.

As seen in FIG. 3, carrier frame assembly 120 includes a frame 138. The frame includes a first one or more elongate members, in this example vertical members, in this case a pair of spaced-apart side portions 140 and 142. The side portions of frame 138 extend adjacent to respective sides 130 and 132 of frame member 122 in this example. Side portions 140 and 142 of the frame extend from top 126 of the frame member towards bottom 128 of the frame member seen in FIG. 1 in this example. Referring back to FIG. 3, the side portions of frame 138 couple to frame member 122, in this example via side peripheral portions 134 and 136 of the frame member. The side peripheral portions of frame member 122 are channel-shaped at least in part so as to receive side portions 140 and 142 in this example.

As seen in FIG. 2, frame 138 includes a second one or more elongate members, in this example one or more horizontal members, in this case, an upper portion 144. The upper portion of the frame couples to and extends between side portions 140 and 142 of the frame. Upper portion 144 of frame 138 is cantilevered to the side portions of the frame in this example. The upper portion of the frame extends from rear 49 towards front 47 of backpack sprayer 40. Side portions 140 and 142 and upper portion 144 of frame 138 comprise metal tubing in this example; however this is not strictly required. As seen in FIG. 3, the upper portion of the frame is u-shaped in top view and integrally formed with the side portions of the frame in this example.

Stand 137 seen in FIG. 1 is spaced-apart from upper portion 144 of frame 138 seen in FIG. 3. The stand seen in FIG. 1 couples to the upper portion of the frame seen in FIG. 3 via side portions 140 and 142 of the frame in this example and via frame member 122.

Still referring to FIG. 3, lower portion 62 of storage container 42 extends overtop of upper portion 144 of frame 138. Inwardly-facing channel 64 of the storage container is shaped to receive and couple to the upper portion of the frame. Lower portion 62 of storage container 42 encloses and couples to upper portion 144 of frame 138 thereby. The storage container thus couples to frame member 122 via the frame. As seen with references to FIGS. 1 to 3, front 46 and sides 50 and 52 of the storage container are thus shaped to enclose upper portion 144 of frame 138 and cover the upper portion of the frame when backpack sprayer 40 is viewed from the sides and the front thereof.

As seen in FIG. 3, carrier frame assembly 120 includes one or more fasteners, in this example bolts 148 and 150. Upper portion 144 of frame 138 further couples to lower portion 62 of storage container 42 via the bolts.

Figure 12:
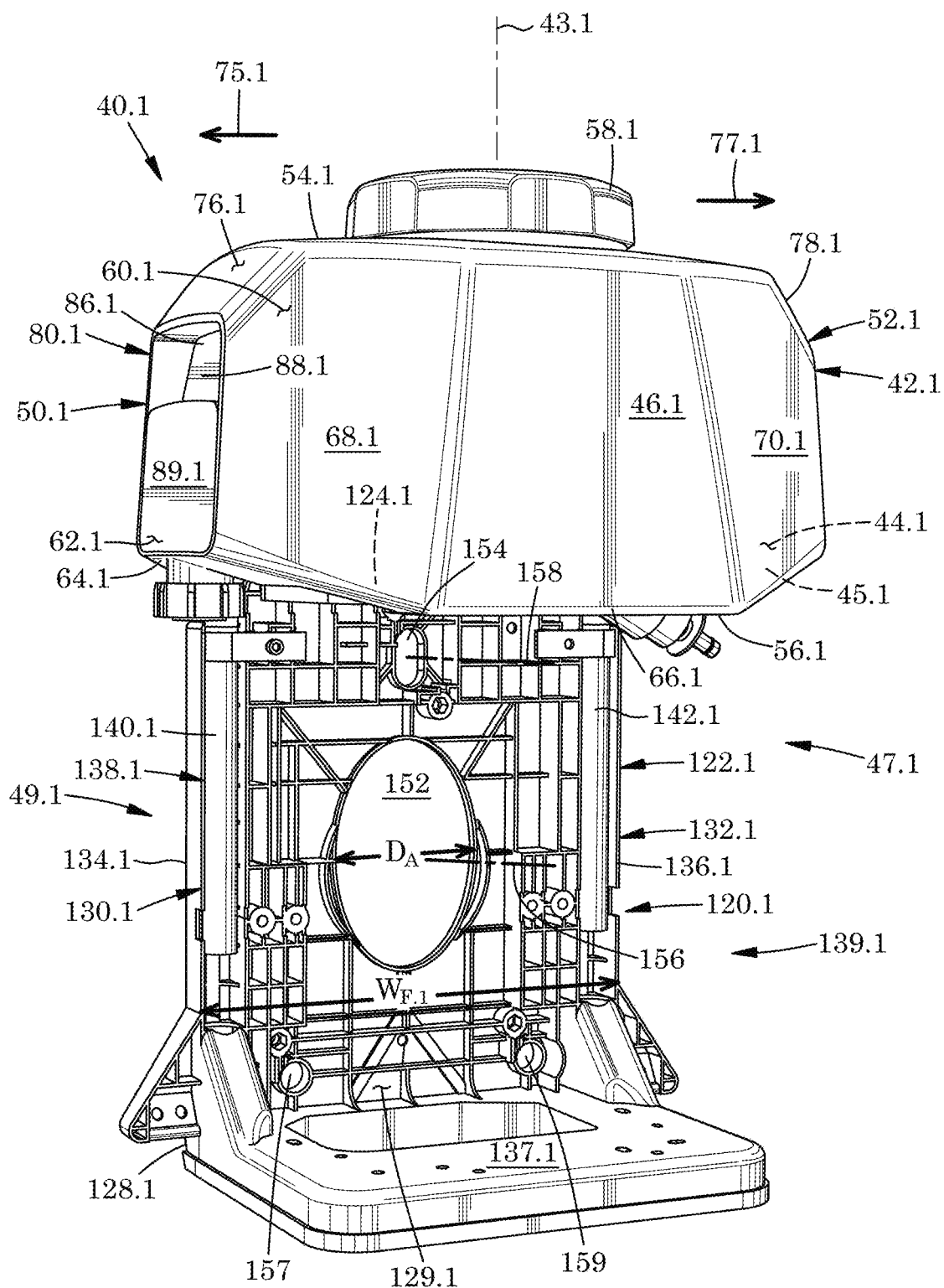
FIG. 12 is a front, right side perspective of a storage container and carrier frame assembly of a backpack sprayer according to a second aspect, with the blower unit and other features of the backpack sprayer being removed and not shown.
Figure 13:
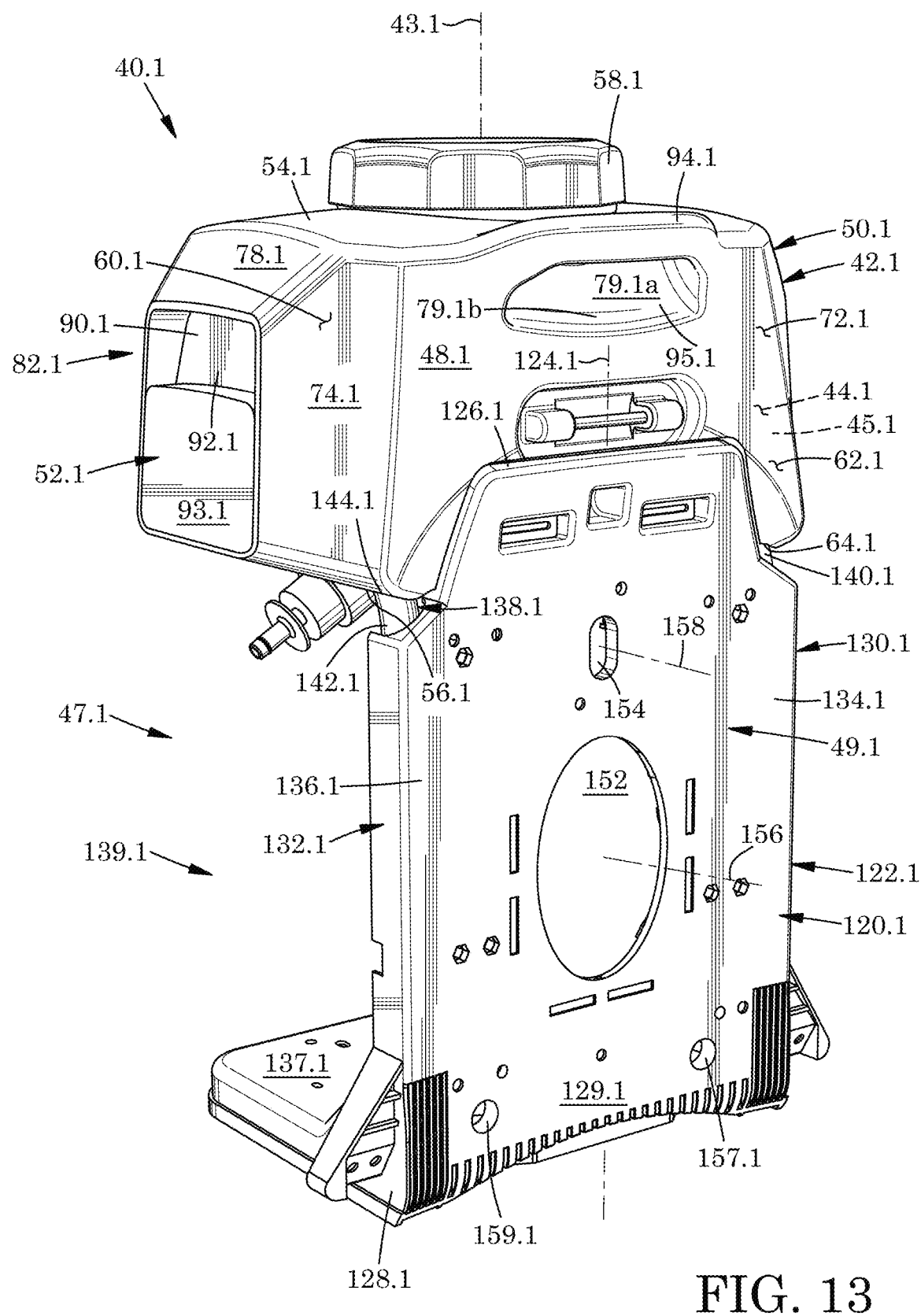
FIG. 13 is a rear, left side perspective view thereof.
Figure 14:
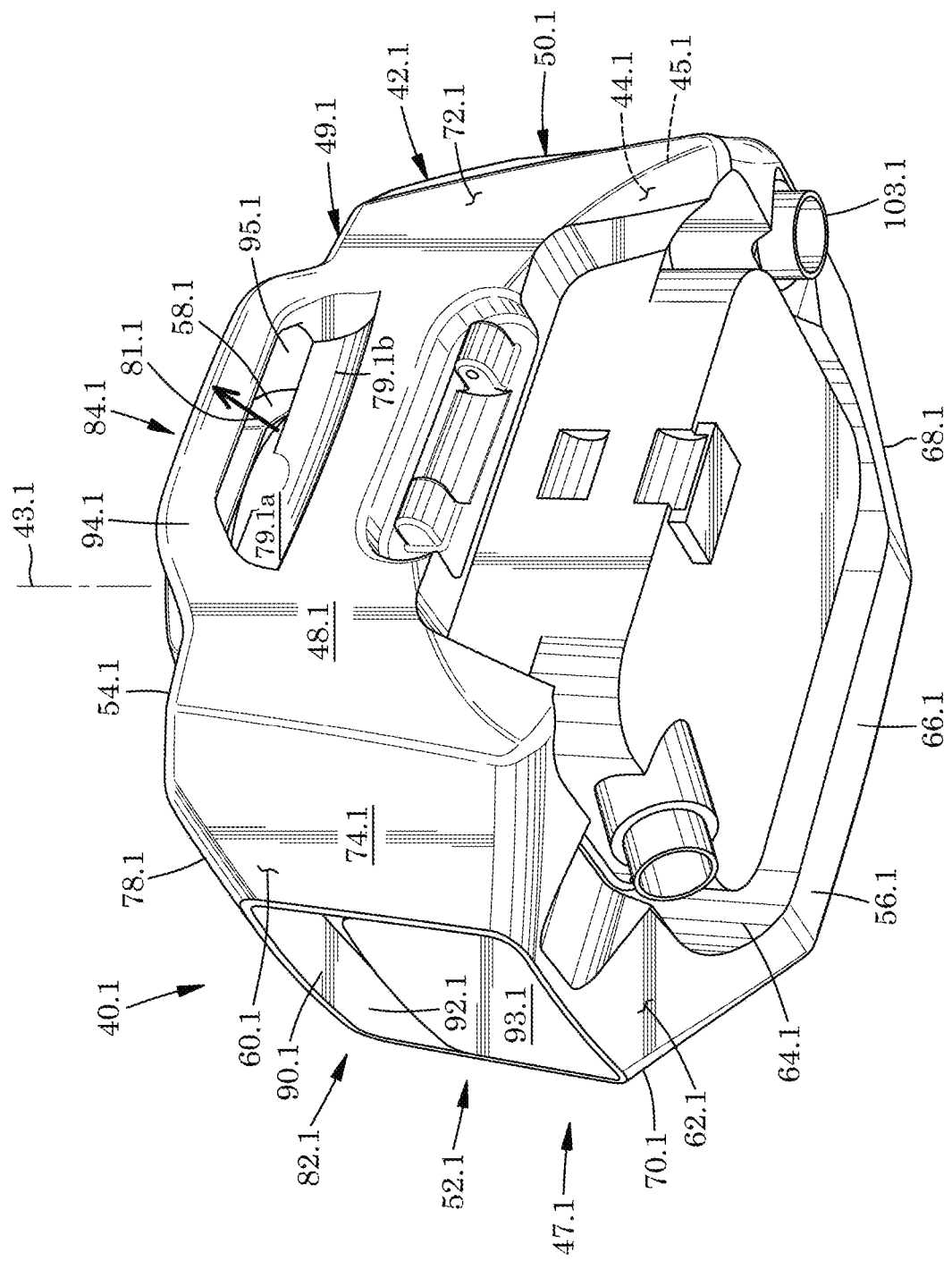
FIG. 14 is a rear, bottom, left side perspective view of the storage container of the backpack sprayer of FIG. 1, with the rest of the backpack sprayer being removed and not shown.

FIGS. 12 to 14 show a backpack sprayer 40.1 according to a second aspect. Like parts have like numbers and functionings as the backpack sprayer 40 shown in FIGS. 1 to 11 with the addition of decimal extension "0.1". Backpack sprayer 40.1 is substantially the same as backpack sprayer 40 shown in FIGS. 1 to 11 with at least the following exceptions.

As seen in FIG. 12, frame member 122.1 has a first, lower or central aperture 152 extending therethrough. The central aperture of the frame member is arc-shaped at least in part in front/rear profile a direction extending between sides 50.1 and 52.1 of storage container 42.1. Central aperture 152 of frame member 122.1 is in circular in this example. The central aperture of the frame member aligns with longitudinal axis 124.1 of frame member 122.1 in this example.

Central aperture 152 of frame member 122.1 is positioned between sides 130.1 and 132.1 of the frame member and enclosed between side portions 140.1 and 142.1 of frame 138.1 in this example. As seen in FIG. 13, the central aperture of the frame member is positioned between top 126.1 and bottom 128.1 of the frame member in this example. Referring back to FIG. 12, central aperture 152 of frame member 122.1 has a diameter $D_A$. The diameter of the central aperture of the frame member is equal to or less than the width $W_{F.1}$ of frame member 122.1 in this example. In this embodiment, diameter $D_A$ of central aperture 152 of the frame member is equal to and spams approximately one third of the width of the frame member; however this is not strictly required.

Referring to FIG. 13, frame member 122.1 has a second or upper aperture 154 spaced-apart from the central aperture of the frame member. The upper aperture of the frame member is oblong in this example. Upper aperture 154 of the frame member is arc-shaped at least in part in front/rear profile in a direction extending between sides 50.1 and 52.1 of storage container 42.1. Apertures 152 and 154 of frame member 122.1 align with longitudinal axis 124.1 of the frame member in this example. Diameter $D_A$ of central aperture 152 is larger than that of upper aperture 154 of the frame member in this example. The apertures of frame member 122.1 extend about spaced-apart axes 156 and 158 that extend parallel with each other in this example. Axes 156 and 158 extend perpendicular to longitudinal axis 124.1 of carrier frame assembly 120.1.

Still referring to FIG. 13, lower peripheral portion 129.1 of frame member 122.1 is arc-shaped at least in part. The lower peripheral portion of the frame member in this example is arc-shaped in a direction extending between sides 130.1 and 132.1 of frame member 122.1 and in a direction extending between sides 50.1 and 52.1 of storage container 42.1. Lower peripheral portion 129.1 of frame member 122.1 is outwardly concave in this example from the perspective of FIG. 13. The lower peripheral portion of the frame member is downwardly facing in this example from the perspective of FIG. 13. Lower peripheral portion 129.1 of frame member 122.1 extends about an axis parallel to axes 156 and 158 of apertures 152 and 154 in this example.

As seen in FIG. 14, storage container 42.1 includes a peripheral portion, in this example a lower peripheral portion 66.1 that is u-shaped in bottom profile in this example and which aligns with bottom 68.1 thereof in this embodiment.

As seen with reference to FIGS. 13 and 14, the storage container and frame member 122.1 are shaped to substantially enclose upper portion 144.1 and side portions 140.1 and 142.1 of frame 138.1 therewithin and/or therebetween.

Referring to FIG. 12, frame member 122.1 includes has a pair of spaced-apart side peripheral apertures, in this example apertures 157 and 159. Aperture 157 is positioned adjacent and/or near lower peripheral portion 129.1 and side peripheral portion 134.1 of the frame member in this example. Aperture 159 is positioned adjacent and/or near the lower peripheral portion and side peripheral portion 136.1 of frame member 122.1 in this example.

FIGS. 15 to 23 show a backpack sprayer 40.2 according to a third aspect. Like parts have like numbers and functionings as the backpack sprayer 40 shown in FIGS. 1 to 11 with the addition of decimal extension "0.2". Backpack sprayer 40.2 is substantially the same as backpack sprayer 40 shown in FIGS. 1 to 11 with at least the following exceptions.

Figure 15:
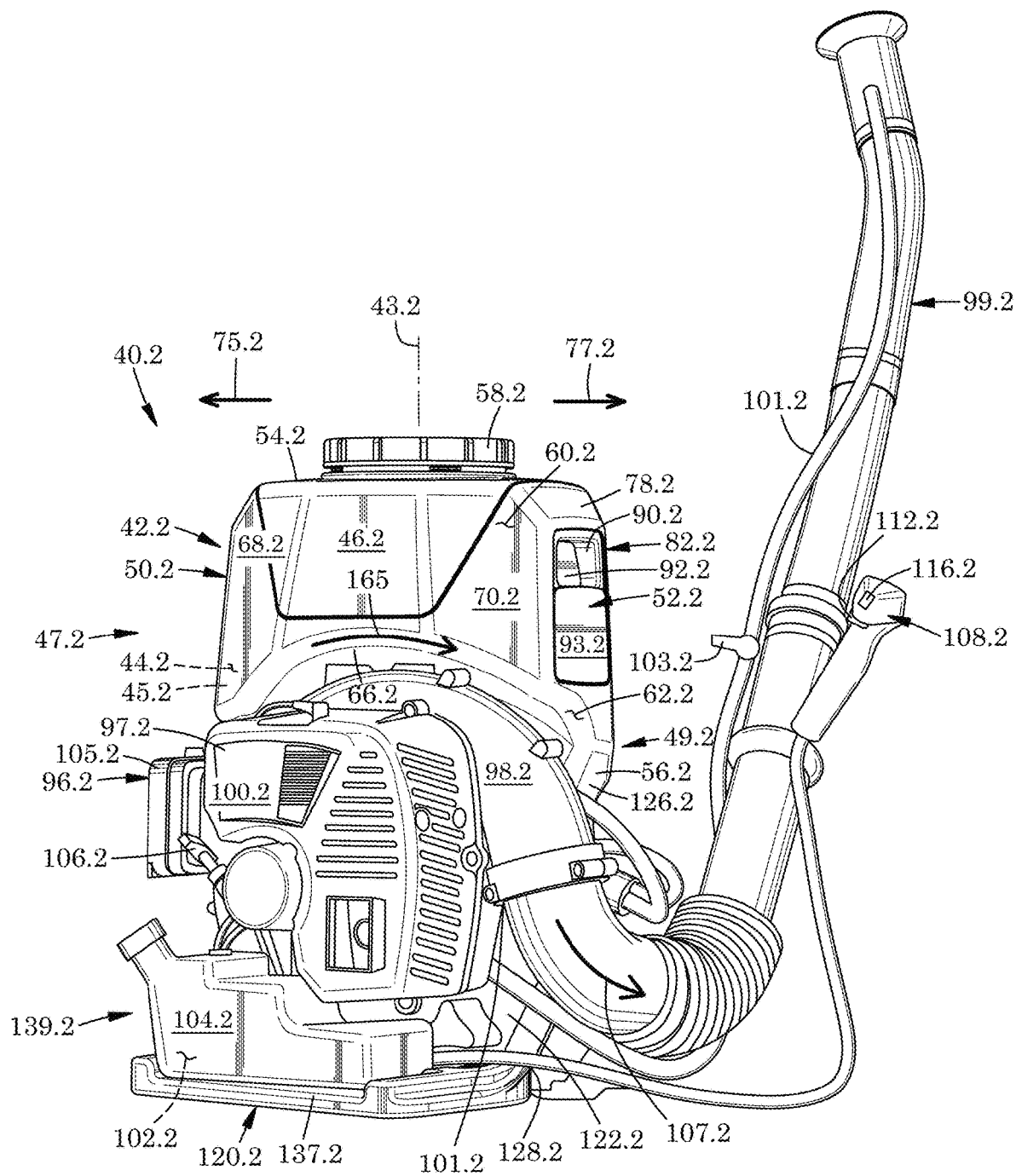
FIG. 15 is a front, left side perspective view of a backpack sprayer according to a third aspect, the backpack sprayer including a storage container, a carrier frame assembly to which the storage container couples via an upper portion thereof, and a blower unit which couples to a lower portion of the carrier frame assembly.
Figure 18:
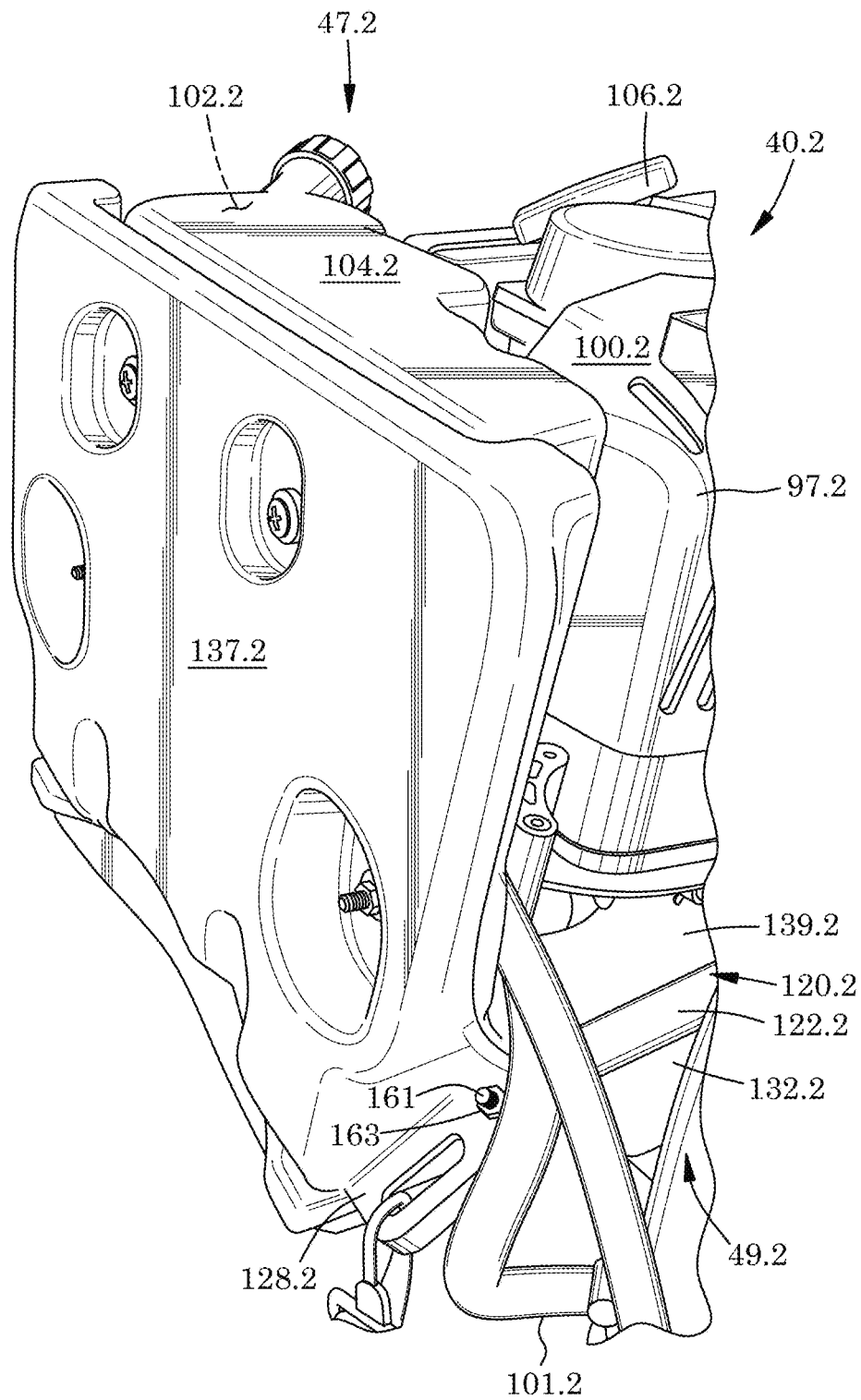
FIG. 18 is a bottom, front, left side perspective view of the backpack sprayer of FIG. 15 including the lower portion of the carrier frame assembly, with the rest of the backpack sprayer being shown in fragment.
Figure 21:
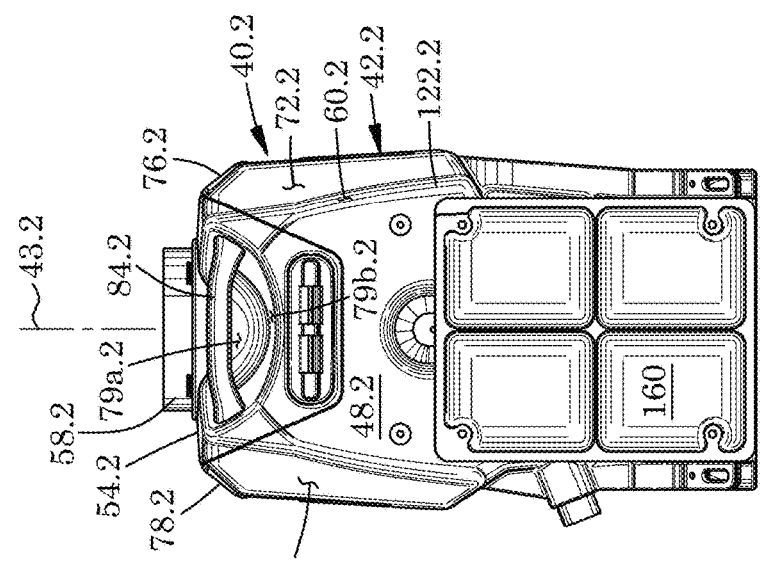
FIG. 21 is a rear elevation view thereof.

As seen in FIG. 15, storage container 42.2 and frame member 122.2 of carrier frame assembly 120.2 are integrally coupled together so as to form an integrated whole. There is no frame comprising tubing in this embodiment. As seen in FIG. 18, stand 137.2 couples to bottom 128.2 of frame member 122.2 via fasteners, in this example bolts 161 and nuts 163.

Figure 16:
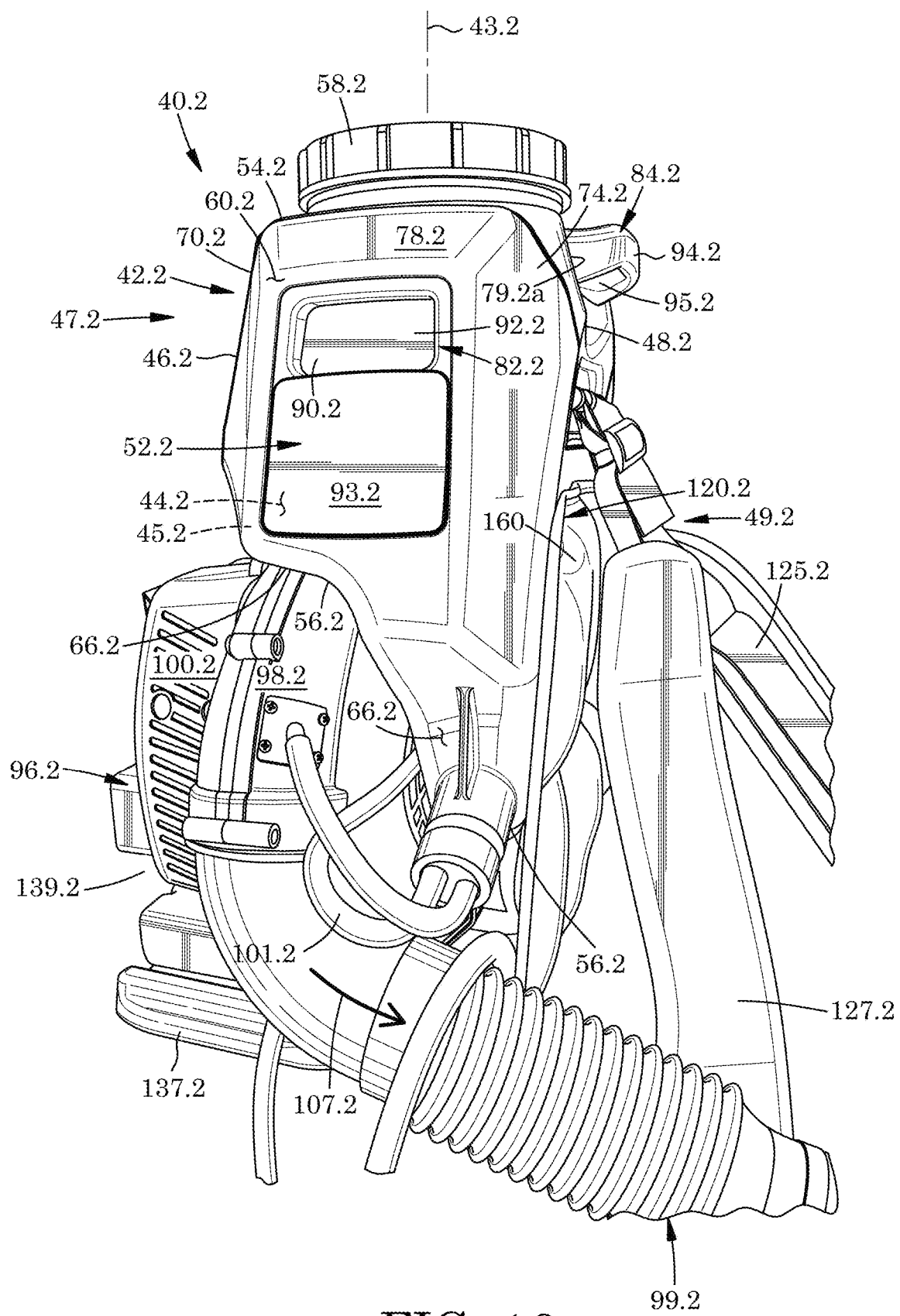
FIG. 16 is a left side perspective view thereof with a blower unit pipe of the blower unit of the backpack sprayer shown in fragment.

As seen in FIG. 16, storage container 42.2 includes a peripheral portion, in this example an intermediate peripheral portion 66.2 of the storage container positioned between top 54.2 and bottom 56.2 of the storage container in this example. Referring back to FIG. 15, the intermediate peripheral portion of the storage container is arc-shaped in this example in a direction extending between sides 50.2 and 52.2 thereof. Intermediate peripheral portion 66.2 of storage container 42.2 is outwardly concave in front profile and downwardly facing in this example and from the perspective of FIG. 15. The intermediate peripheral portion of storage container is shaped to accommodate and extend in a direction 165 that generally follows the curvature of fan unit 98.2.

As seen in FIG. 16, lower portion 62.2 of storage container 42.2 is arc-shaped and outwardly concave in side profile in this example embodiment.

The lower portion of the storage container is shaped to receive and extend in part behind fan unit 98.2 of blower unit 96.2 in this example. Bottom 56.2 of storage container 42.2 is positioned behind the fan unit in this example. Lower portion 62.2 of storage container 42.2 tapers in side profile in a direction extending from intermediate peripheral portion 66.2 of the storage container towards the bottom of the storage container.

Figure 17:
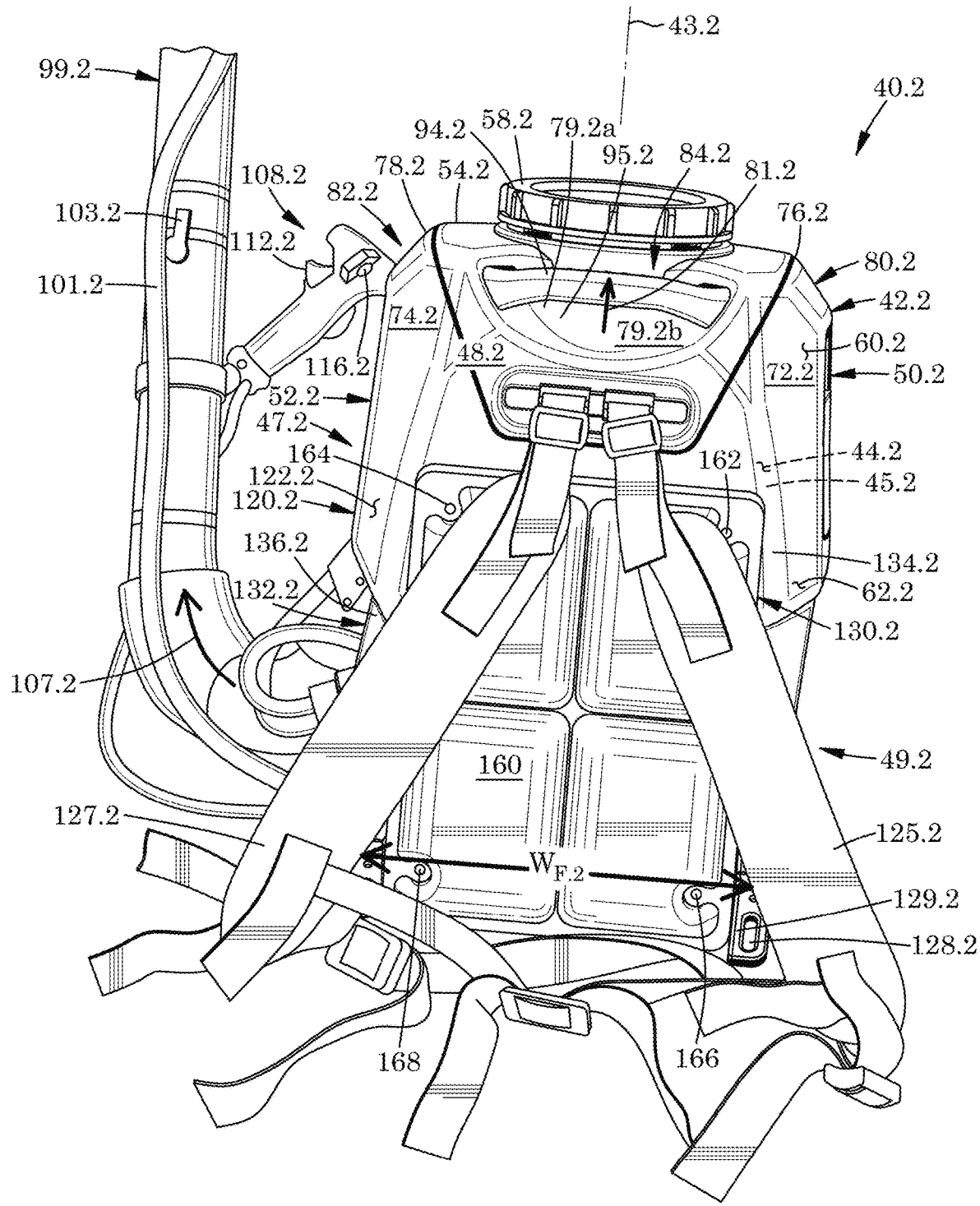
FIG. 17 is a rear perspective view thereof with a blower unit pipe of the blower unit of the backpack sprayer shown in fragment.

As seen in FIG. 17, backpack sprayer 40.2 includes a back pad 160 shaped to provide cushioning to the back of the operator (not shown) when the backpack sprayer is back-mounted. The back pad is generally planar and rectangular in rear profile in this example. Back pad 160 couples to and extends along frame member 122.2 of carrier frame assembly 120.2 via a plurality of fasteners, in this example bolts 162, 164, 166 and 168.

Figure 20:
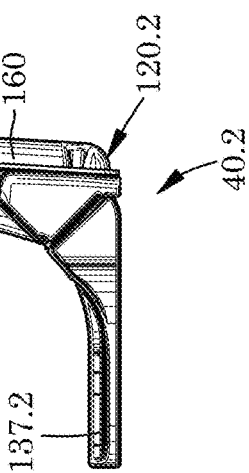
FIG. 20 is a left side elevation view thereof.

As seen in FIG. 20, central handle 84.2 of storage container 42.2 is positioned level with or below top 54.2 of the storage container. The central handle of the storage container extends outwards from rear 48.2 of the storage container so as to align with and/or extend to a distance equal to or less than that of back pad 160.

Figure 19:
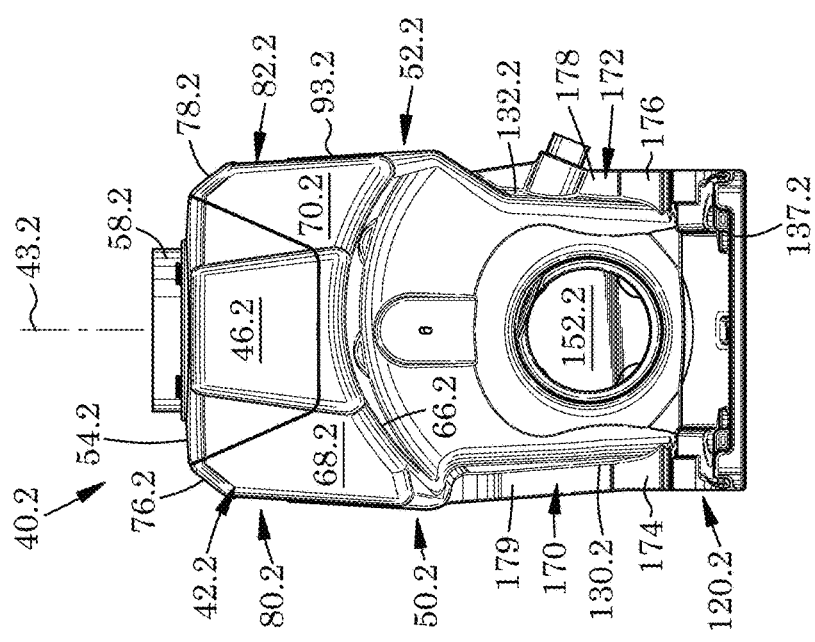
FIG. 19 is a front elevation view of the backpack sprayer of FIG. 15, with the blower unit and a fuel container thereof being removed and not shown.
Figure 23:
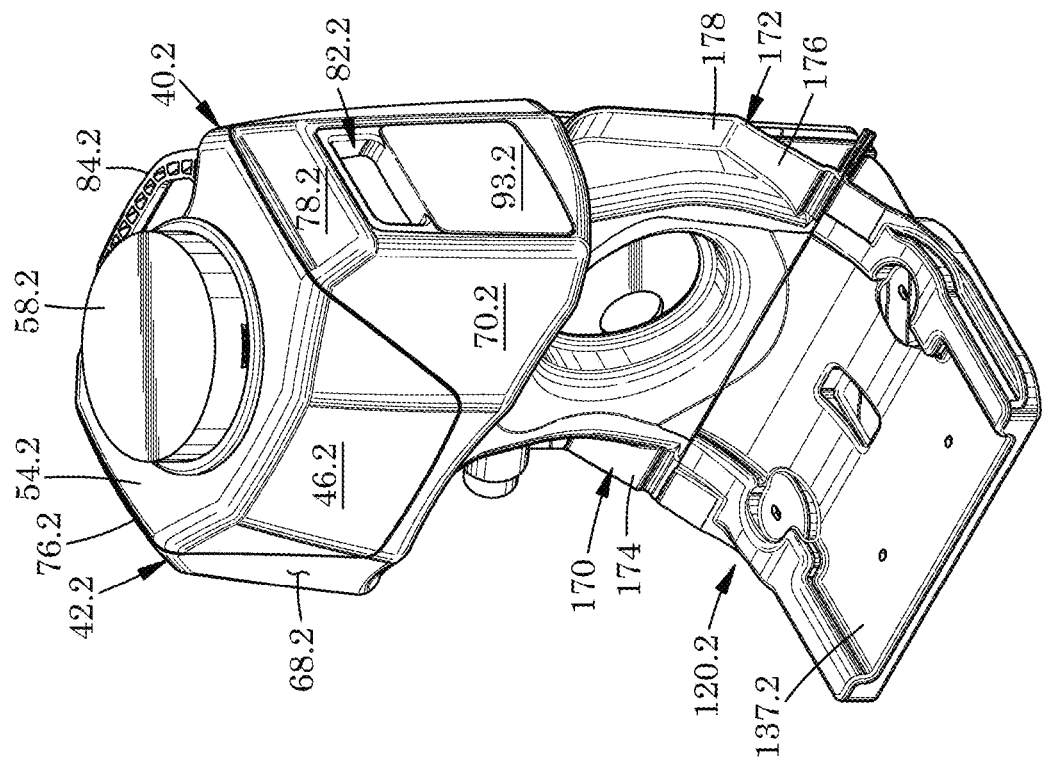
FIG. 23 is a front, left side, top perspective view thereof.
Figure 22:
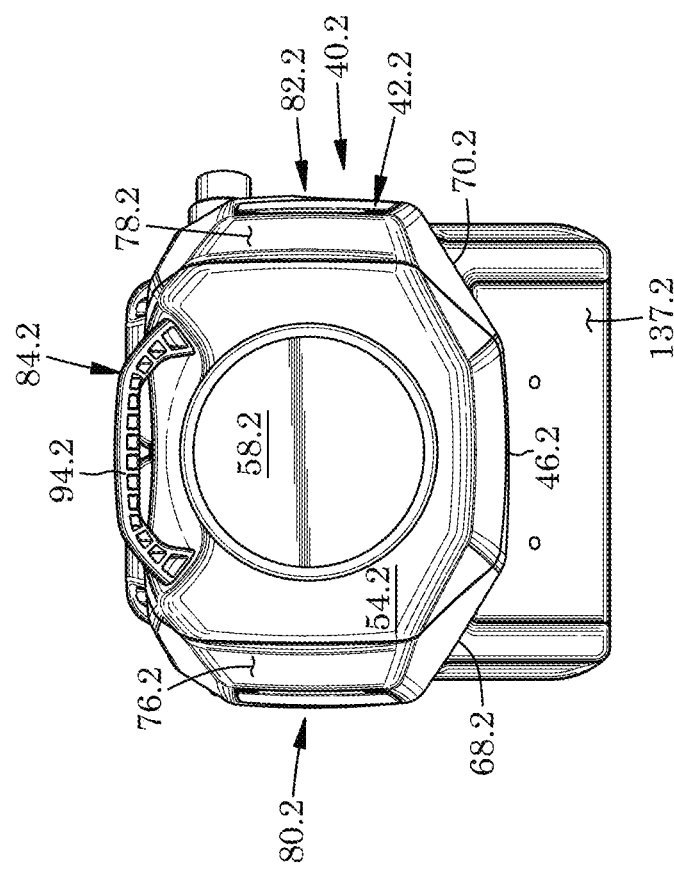
FIG. 22 is a top plan view thereof.

As seen in FIG. 19, carrier frame assembly 120.2 includes a pair of spaced-apart strengthening members, in this example flanges 170 and 172. The flanges couple to and extend outwards sides 130.2 and 132.2 of frame member 122.2 in this example. As seen in FIGS. 19 and 23, the flanges are arc-shaped like with angled or bent portions 174 and 176 and elongate vertical portions 178 and 179 coupled thereto and extending therebetween in this example. The bent portions and vertical portions are rectangular in profile in this example. As seen in FIG. 20, frame member 122.2 of carrier frame assembly 120.2 is thus generally arc-shaped in side profile at least in part and along side peripheral portions 134.2 and 136.2 thereof in this example.

FIGS. 24 to 28 show a backpack sprayer 40.3 according to a fourth aspect. Like parts have like numbers and functionings as the backpack sprayer 40.1 shown in FIGS. 12 to 14 and backpack sprayer 40.2 seen in FIGS. 15 to 23, with decimal extension "0.3" replacing decimal extension "0.1" and "0.2", respectively and being added for parts not previously having a decimal extension. Backpack sprayer 40.3 is substantially the same as backpack sprayers 40.1 and 40.2 shown in FIGS. 12 to 14 and 15 to 23 with at least the following exceptions.

Figure 24:
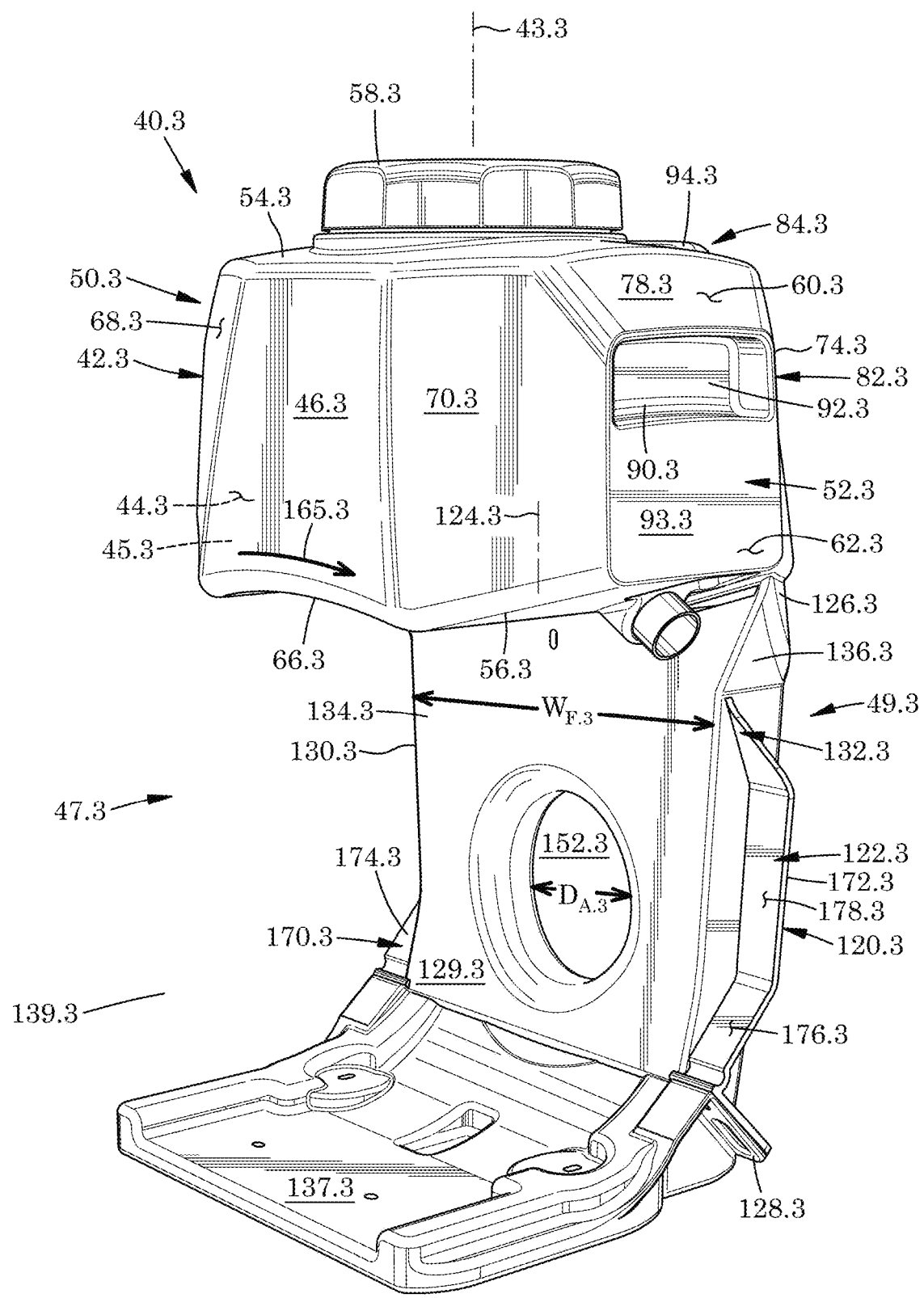
FIG. 24 is a front, left side perspective view of the storage container and carrier frame assembly of a backpack sprayer according to a fourth aspect, with the blower unit and other features of the backpack sprayer being removed and not shown.

Similar to backpack sprayer 40.2 and as seen in FIG. 24, storage container 42.3 and frame member 122.3 of carrier frame assembly 120.3 are integrally coupled together so as to form an integrated whole. There is no frame comprising tubing in this embodiment.

Figure 25:
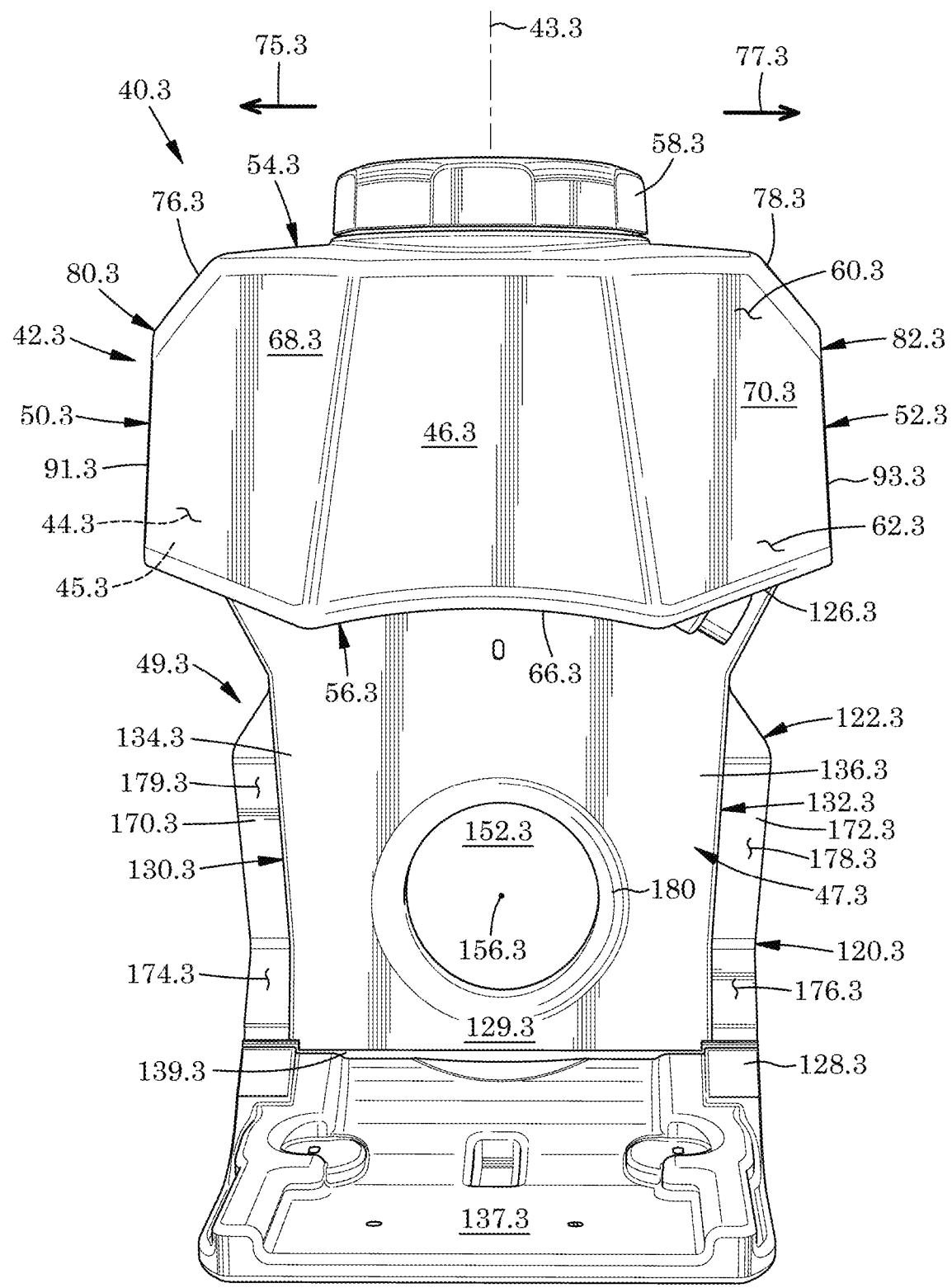
FIG. 25 is a front perspective view thereof.
Figure 26:
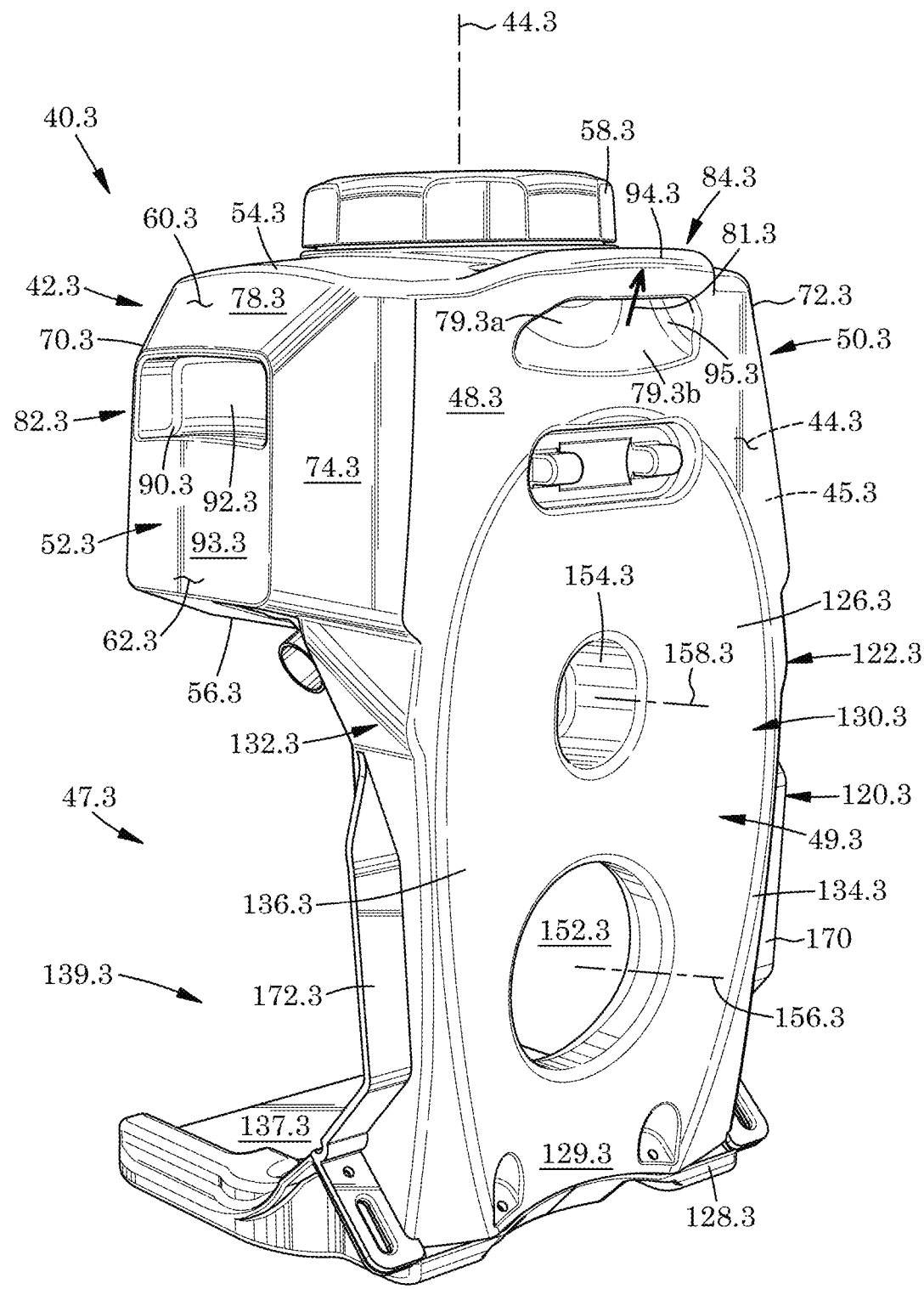
FIG. 26 is a rear, left side perspective view thereof.

As seen in FIG. 25, frame member 122.3 has a first recessed region 180 extending from front 47.3 and tapering towards the rear 49.3 of backpack sprayer 40.3 in this example. The first recessed region is coaxial with and extends about lower aperture 152.3 of the frame member in this example. First recessed region 180 of frame member 122.3 is centrally annular in this example.

Figure 27:
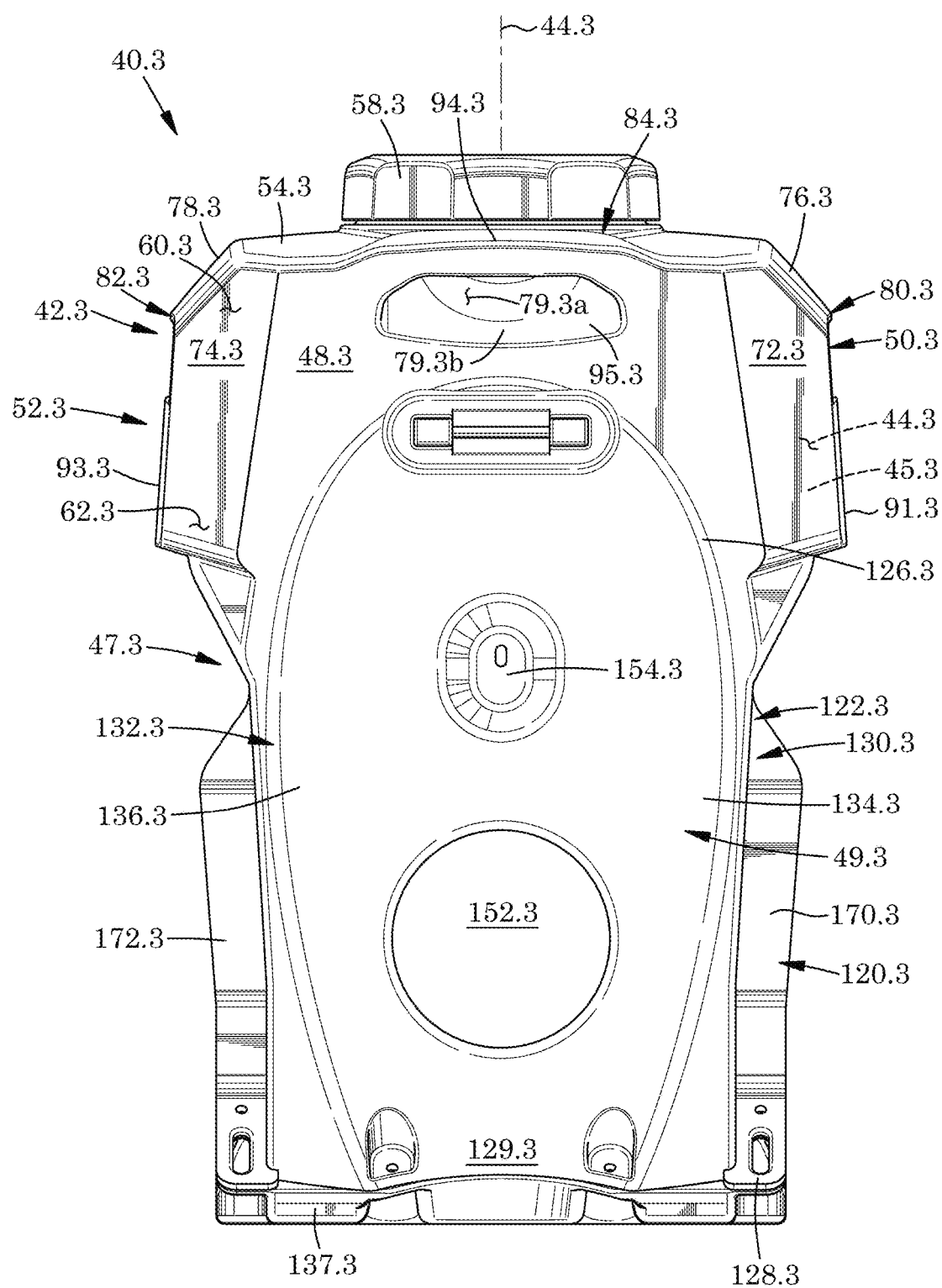
FIG. 27 is a rear perspective view thereof.
Figure 28:
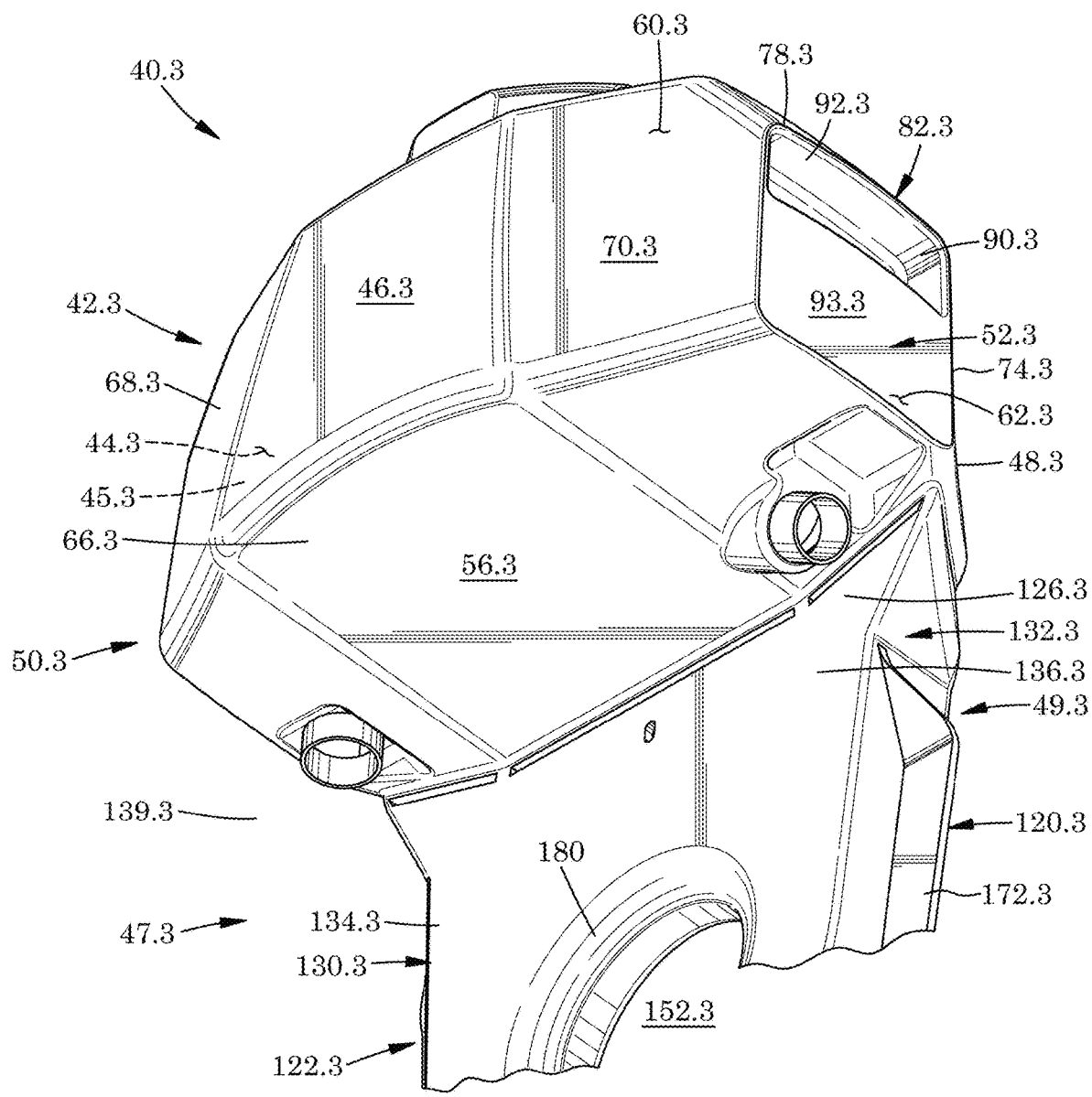
FIG. 28 is a front, left side, bottom perspective view thereof, with the carrier frame assembly being shown in fragment.

As seen in FIG. 27, upper aperture 154.3 of frame member 122.3 does not extend all way through the frame member and may thus be referred to as a recessed region in this example. The upper aperture of the frame member extends from rear 49.3 of backpack sprayer 40.3 and tapers towards front 47.3 of the backpack sprayer in this example.

As seen in FIG. 25, lower peripheral portion 66.3 of storage container 42.3 is arc-shaped only in a region aligned with and adjacent to front 46.3 of the storage container between angled surfaces 68.3 and 70.3 of the storage container in this example. The storage container tapers in a downward direction parallel to longitudinal axis 43.3 of backpack sprayer 40.3, from sides 50.3 and 52.3 of the storage container towards the lower peripheral portion of the storage container in this example.

Figure 29:
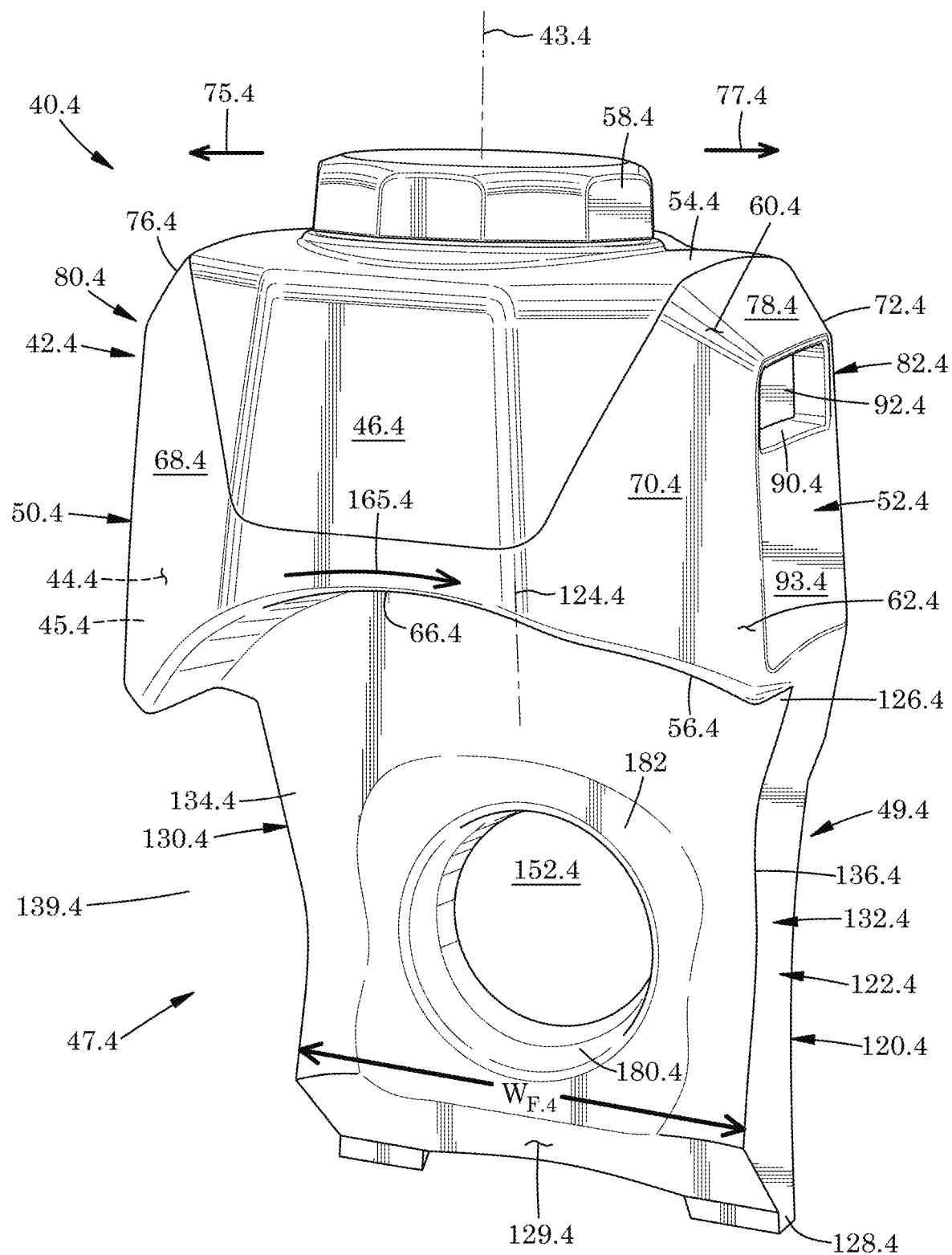
FIG. 29 is a front, left side perspective view of the storage container and carrier frame assembly of a backpack sprayer according to a fifth aspect, with the blower unit and other features of the backpack sprayer being removed and not shown.
Figure 30:
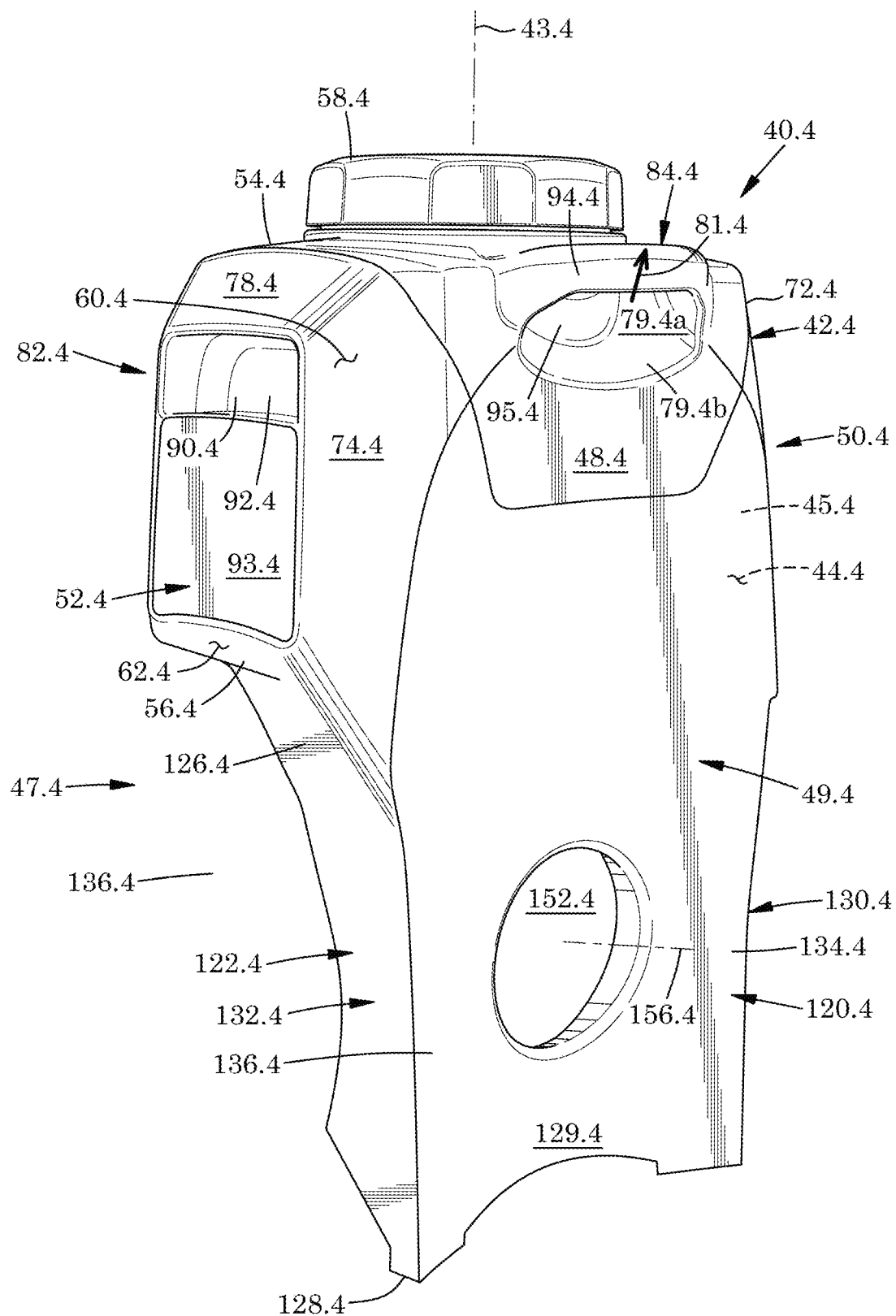
FIG. 30 is a rear, left side perspective view thereof.

FIGS. 29 and 30 show a backpack sprayer 40.4 according to a fifth aspect. Like parts have like numbers and functionings as the backpack sprayer 40.3 shown in FIGS. 24 to 28 with decimal extension "0.4" replacing decimal extension "0.3" and being added for parts not previously having a decimal extension. Backpack sprayer 40.4 is substantially the same as backpack sprayer 40.3 shown in FIGS. 24 to 28 with at least the following exceptions.

As seen in FIG. 29, frame member 122.4 has a second recessed region 182 extending from front 47.4 and tapering towards rear 49.4 of backpack sprayer 40.4 in this example. The second recessed region is in fluid communication with, extends about and is coaxial with first recessed region 180 of the frame member in this example.

Lower peripheral portion 66.4 of storage container 42.4 is continuously and fully arc-shaped in front profile along front 46.3 of storage container 42.4 including below surfaces 68.4 and 70.4 of the storage container in this example.

As seen with reference to FIGS. 29 and 30, side peripheral portions 134.4 and 136.4 of frame member 122.4 are arc-shaped at least in part in front and rear profile in this example. Side peripheral portion 134.4 is arc-shaped and outwardly concave in a direction facing side 50.4 of the frame member in this example. Side peripheral portion 136.4 is arc-shaped and outwardly concave in a direction facing side 52.4 of frame member 122.4 in this example.

Figure 32:
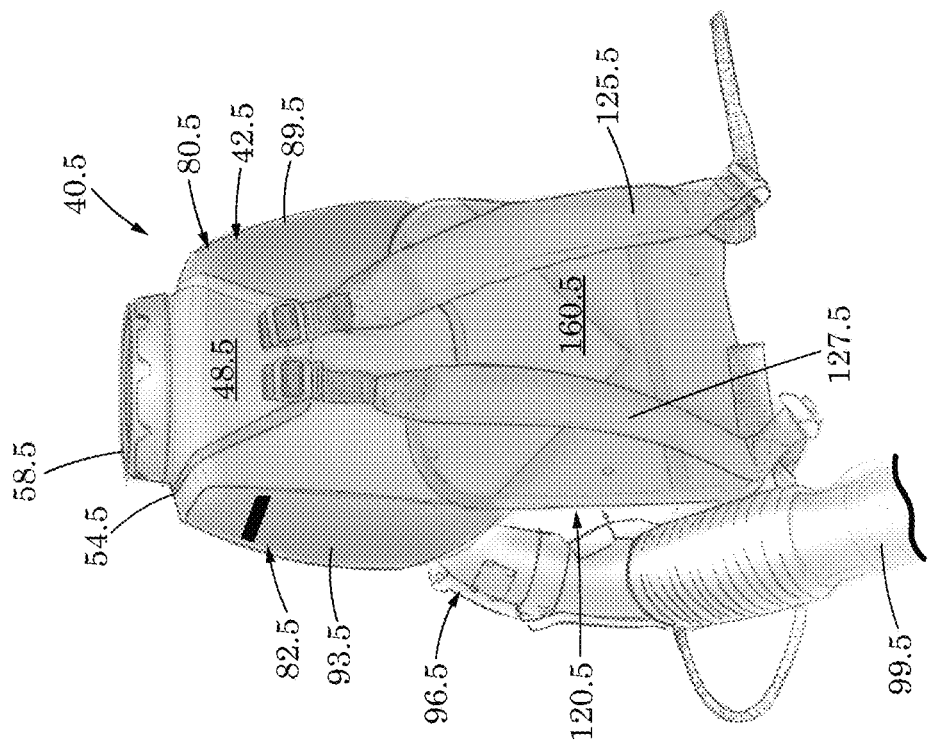
FIG. 32 is a rear, left side perspective view thereof, with a blower unit pipe thereof shown in fragment.
Figure 31:
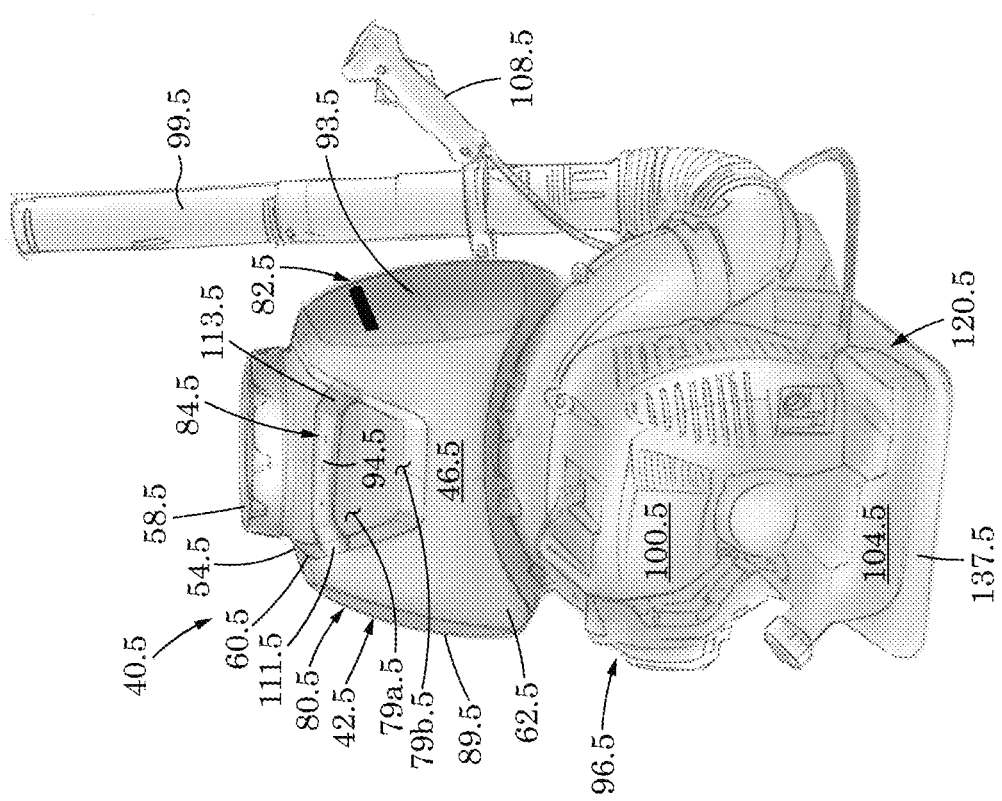
FIG. 31 is a front, left side perspective view of a backpack sprayer according to a sixth aspect.

FIGS. 31 and 32 show a backpack sprayer 40.5 according to a sixth aspect. Like parts have like numbers and functionings as backpack sprayer 40.2 shown in FIGS. 15 to 23 with decimal extension "0.5" replacing decimal extension "0.2" and being added for parts not previously having a decimal extension. Backpack sprayer 40.5 is similar to backpack sprayer 40.2 shown in FIGS. 15 to 23 with at least the following exceptions.

As seen in FIG. 31, central handle 84.5 of storage container 42.5 is positioned between and forwards of side handles 80.5 and 82.5 of the storage container in this example. The central handle of the storage container couples to and is integrally formed with front 46.5 and top 54.5 of the storage container in this example. Central handle 84.5 of storage container 42.5 extends outwards in part and upwards in part relative to the storage container in this example. The central handle of the storage container extends substantially perpendicular to side handles 80.5 and 82.5 of the storage container in this example. Central handle 84.5 of the storage container is fixed relative to positioning of side handles 80 of the storage container.

Storage container 42.5 may be said to generally taper in a direction extending from lower portion 62.5 thereof towards top 54.5 thereof. The top of the storage container is thus smaller in extent or laterally section compared to the lower portion of the storage container in this embodiment.

As seen in FIGS. 31 and 32, front 46.5, side surfaces 89.5 and 93.5 and rear 48.5 of storage container 42.5 are outwardly convex in this example. As seen in FIG. 31, concave surface 79a0.5 of storage container 42.5 is an isosceles trapezoid in shape in this example. Concave surface 79b.5 of the storage container is V-shaped in front profile in this example, with end portions 111.5 and 113.5 of handle 84.5 coupling thereto. Concave surface 79b.5 may be said to comprise a beveled surface or shoulder extending between front 46.5 of storage container 42.5 and concave surface 79b.5 of the storage container.

Figure 34:
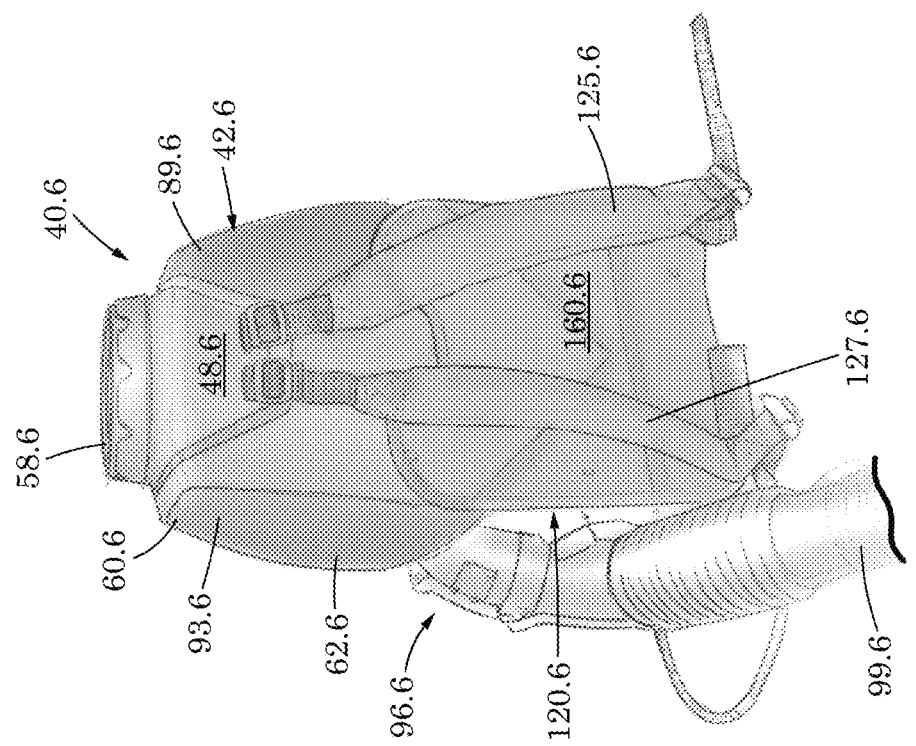
FIG. 34 is a rear, left side perspective view thereof, with a blower unit pipe thereof shown in fragment.
Figure 33:
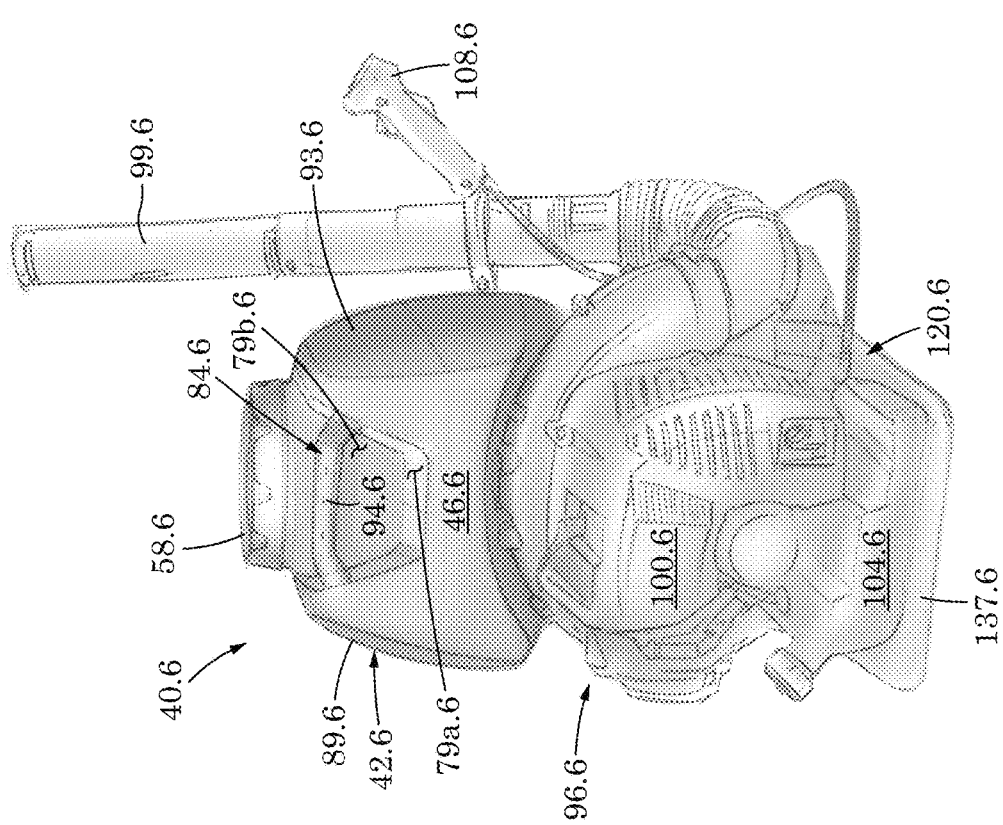
FIG. 33 is a front, left side perspective view of a backpack sprayer according to a seventh aspect.

FIGS. 33 and 34 show a backpack sprayer 40.6 according to a seventh aspect. Like parts have like numbers and functionings as the backpack sprayer 40.5 shown in FIGS. 31 to 32 with decimal extension "0.6" replacing decimal extension "0.5" and being added for parts not previously having a decimal extension. Backpack sprayer 40.6 is similar to backpack sprayer 40.5 shown in FIGS. 31 and 32 with the exception that storage container 42.6 has no side handles. Side surfaces 89.6 and 93.6 of the storage container are streamline, outwardly convex and continuous in shape in this embodiment.

Figures 35, 36:
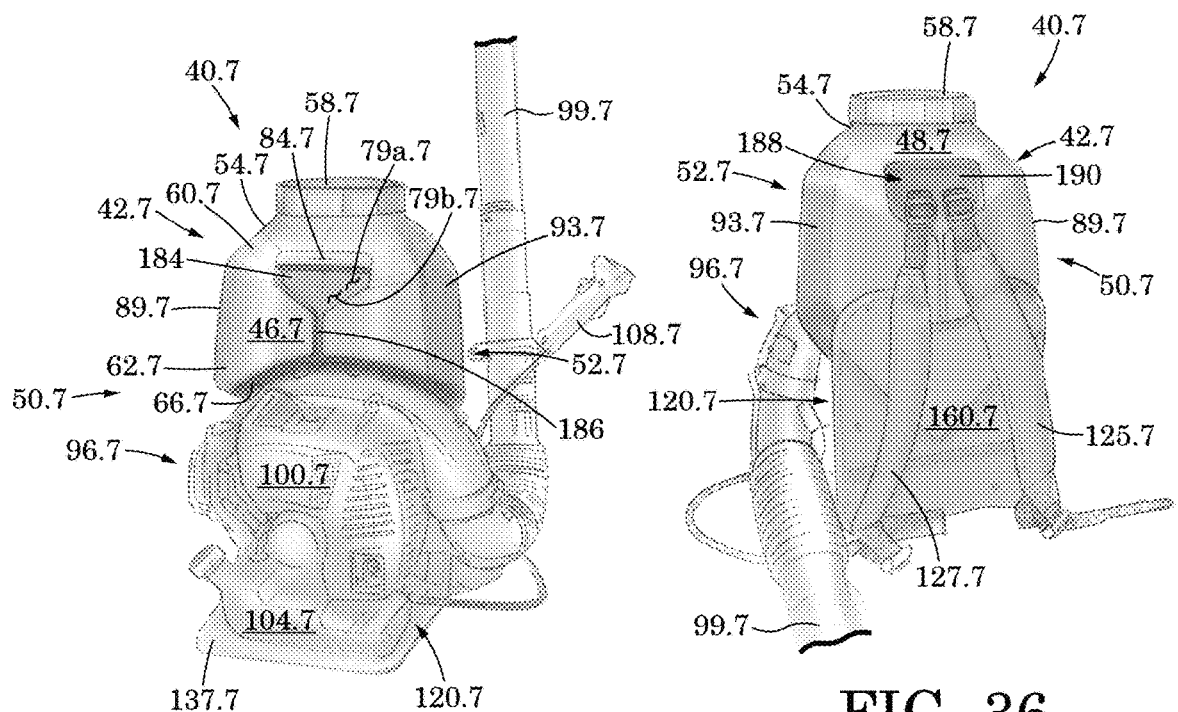
FIG. 35 is a front, left side perspective view of a backpack sprayer according to an eighth aspect, with a blower unit pipe thereof shown in fragment.
FIG. 36 is a rear, left side perspective view thereof, with a blower unit pipe thereof shown in fragment.

FIGS. 35 and 36 show a backpack sprayer 40.7 according to an eighth aspect. Like parts have like numbers and functionings as the backpack sprayer 40.6 shown in FIGS. 33 to 34 with decimal extension "0.7" replacing decimal extension "0.6" and being added for parts not previously having a decimal extension. Backpack sprayer 40.7 is similar to backpack sprayer 40.6 shown in FIGS. 33 to 34 with the following exceptions.

Storage container 42.7 includes a centrally-positioned first handle 84.7. The first handle couples to and is integrally formed with front 46.7 of the storage container. First handle 84.7 aligns flush with and is recessed in part relative to the front of the storage container. The first handle has a recessed portion 184 that is triangular in this example. Surface 79a.7 of storage container 42.7 is rectangular front profile in this example and surface 79b.7 of the storage container is triangular front profile in this example. A slot 186 extends from recessed portion 184 of first handle 84.7 to lower peripheral portion 66.2 of the storage container. The slot and first handle are centrally positioned relative to sides 50.7 and 52.7 of storage container 42.7 in this example.

As seen in FIG. 36, the storage container includes a centrally-positioned second handle 188. The second handle is integrally formed with rear 48.7 of storage container 42.7. Each of handles 84.7 and 188 seen in FIGS. 35 and 36 extends between opposed sides 50.7 and 52.7 of the storage container. Referring to FIG. 36, the second handle aligns flush with and is recessed in part relative to rear 48.7 of storage container 42.7. Second handle 188 includes a recessed portion 190 that is rectangular in rear profile this example. The recessed portion of the second handle is outwardly convex in this example. Backpack straps 125.7 and 127.7 couple to storage container 42.7 via recessed portion 190 of second handle 188 in this example.

Figures 37, 38:
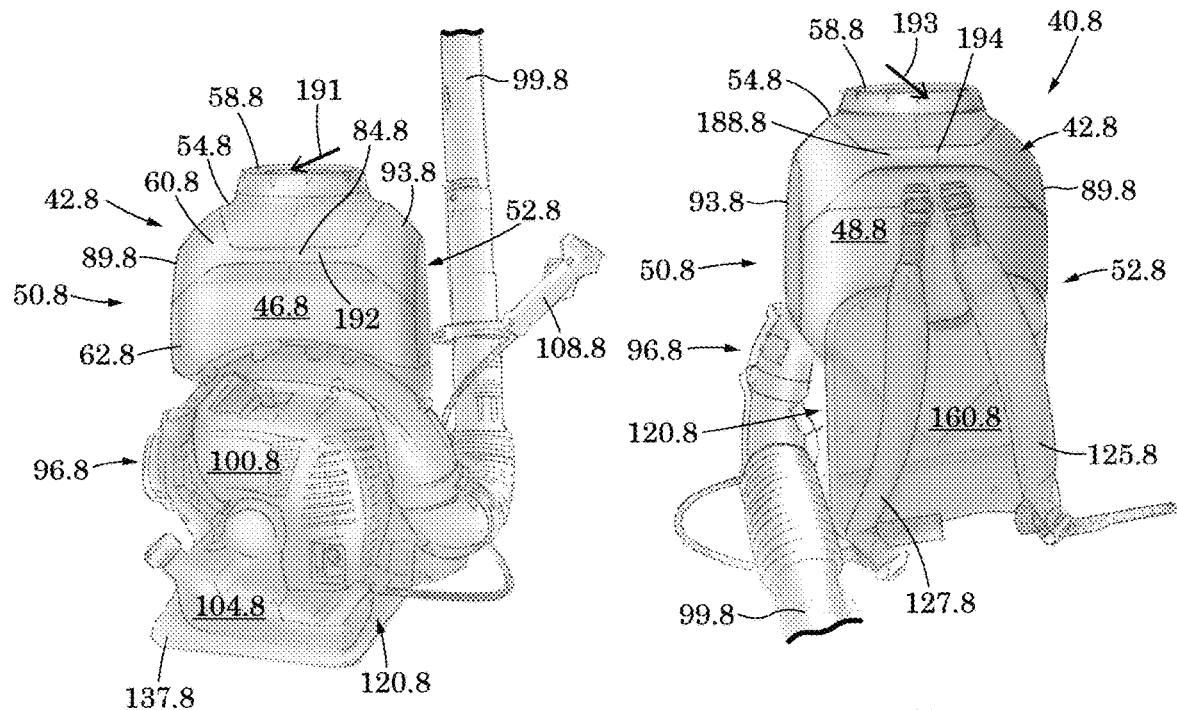
FIG. 37 is a front, left side perspective view of a backpack sprayer according to a ninth aspect, with a blower unit pipe thereof shown in fragment.
FIG. 38 is a rear, left side perspective view thereof, with a blower unit pipe thereof shown in fragment.

FIGS. 37 and 38 show a backpack sprayer 40.8 according to a ninth aspect. Like parts have like numbers and functionings as the backpack sprayer 40.7 shown in FIGS. 35 to 36 with decimal extension "0.8" replacing decimal extension "0.7" and being added for parts not previously having a decimal extension. Backpack sprayer 40.8 is similar to backpack sprayer 40.7 shown in FIGS. 35 and 36 with the following exceptions.

As seen in FIG. 37, first handle 84.8 of storage container 42.8 includes an elongate protrusion 192. The elongate protrusion of the first handle is integrally formed with and extends between top 54.8 and front 46.8 of the storage container. Elongate protrusion 192 of first handle 84.8 is integrally formed with and extends outwards from opposed sides 50.8 and 52.8 of storage container 42.8 in this example. The elongate protrusion of the first handle tapers in a first direction 191 extending from rear 48.7 towards front 46.7 of the storage container.

As seen in FIG. 38, second handle 188.8 of storage container 42.8 includes an elongate protrusion 194. The elongate protrusion of the second handle is integrally formed with and extends between top 54.8 and rear 48.8 of the storage container. Elongate protrusion 194 of second handle 188.8 is integrally formed with and extends outwards from opposed sides 50.8 and 52.8 of storage container 42.8. The elongate protrusion of the second handle tapers in a second direction 193 (opposite first direction 191) extending from rear 48.7 towards front 46.7 of storage container 42.8.

As seen in FIGS. 37 and 38, each elongate protrusions 192 and 194 is laterally and horizontally extending in this example. Each elongate protrusion is an isosceles trapezoid or bell-shaped in lateral cross-section in this example.

Figure 39:
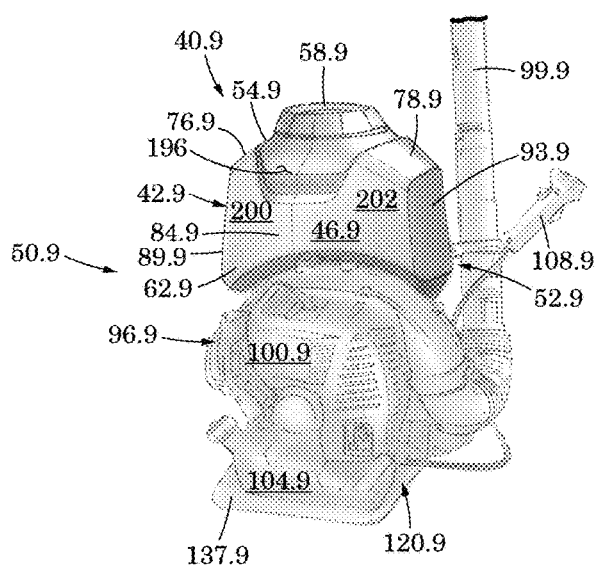
FIG. 39 is a front, left side perspective view of a backpack sprayer according to a tenth aspect, with a blower unit pipe thereof shown in fragment.
Figure 40:
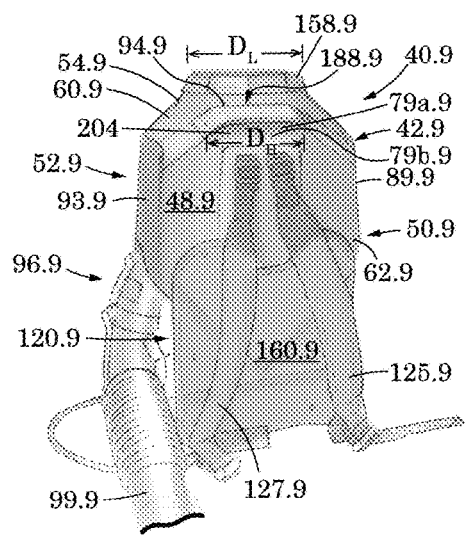
FIG. 40 is a rear, left side perspective view thereof, with a blower unit pipe thereof shown in fragment.

FIGS. 39 and 40 show a backpack sprayer 40.9 according to a tenth aspect. Like parts have like numbers and functionings as the backpack sprayer 40.2 shown in FIGS. 15 to 23 with decimal extension "0.9" replacing decimal extension "0.2" and being added to parts not previously having decimal numbers. Backpack sprayer 40.9 is similar to backpack sprayer 40.2 shown in FIGS. 15 to 23 with the following exceptions.

As seen in FIG. 39, top 54.9 and a central upper portion 196 of front 46.9 of storage container 42.9 are recessed relative to lower portion 62.9 of the storage container. The top and central upper portion of the front of the storage container are also recessed relative to side portions 200 and 202 of the front of the storage container and relative to angled surfaces 76.9 and 78.9 of the storage container. Lower portion 62.9 of storage container 42.9, together with recessed central upper portion 196 of front 46.9 of the storage container, form centrally-positioned first handle 84.9. The front of the storage container is U-shaped in front profile in this example. There are no side handles in this embodiment, though this is not strictly required.

As seen in FIG. 40, centrally-positioned second handle 188.9 is integrally formed with top 54.9 of storage container 42.9 in this example adjacent rear 48.9 of the storage container. The second handle includes a recessed portion 204 that is an isosceles trapezoid in shape/rear-profile in this example. Second handle 188.9 is outwardly concave in a downwards direction in this example. Elongate outer member 94.9 of the second handle aligns with or is positioned below removable lid 58.9. Second handle 188.9 aligns with and spans a distance $D_H$ equal to less than the distance or diameter $D_L$ of removable lid 58.9 of storage container 42.9. The handle is positioned to be generally streamline with top 54.9, which slopes outwards and downwards from lid 58.9 towards sides 50.9 and 52.9, front 46.9 and rear 48.9 of the storage container seen in FIGS. 39 and 40 in this example.

Figure 41:
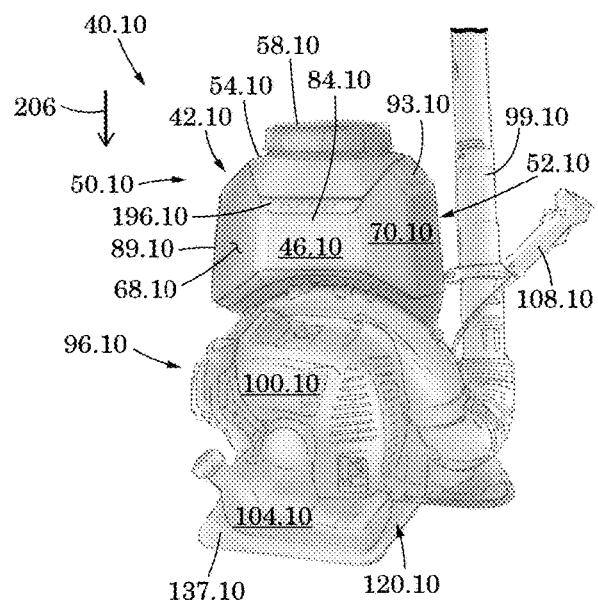
FIG. 41 is a front, left side perspective view of a backpack sprayer according to an eleventh aspect, with a blower unit pipe thereof shown in fragment.
Figure 42:
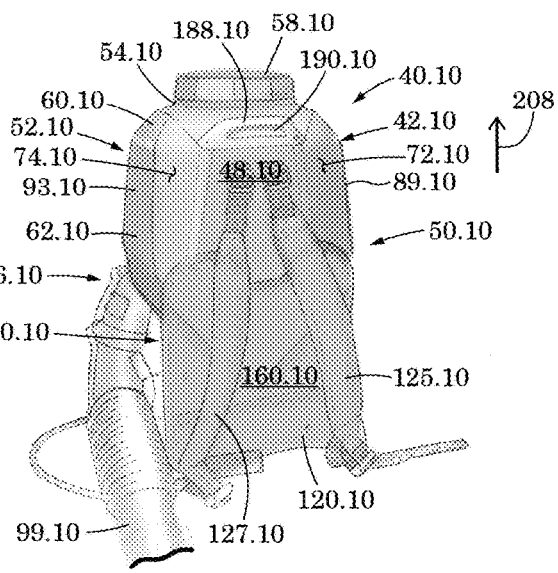
FIG. 42 is a rear, left side perspective view thereof, with a blower unit pipe thereof shown in fragment.

FIGS. 41 and 42 show a backpack sprayer 40.10 according to an eleventh aspect. Like parts have like numbers and functionings as the backpack sprayer 40.10 shown in FIGS. 39 and 40 with decimal extension "0.10" replacing decimal extension "0.9" and being added for parts not previously having a decimal extension. Backpack sprayer 40.10 is similar to backpack sprayer 40.9 shown in FIGS. 39 and 40 with the following exceptions.

As seen in FIG. 41, storage container 42.10 has a front angled surface 196.10 generally extending between top 54.10 and front 46.10 thereof. Front 46.10 protrudes outwards from top and sides 50.10 and 52.10 of the storage container and forms a central handle 84.10. The front angled surface is an isosceles trapezoid in front profile in this example and tapers in a direction 206 extending from top 54.10 towards stand 137.10.

As seen in FIG. 42, second handle 188.10 aligns flush with rear 48.10 of storage container 42.10 in this example. Recessed portion 190.10 of the second handle is an isosceles trapezoid in rear profile in this example. The recessed portion of second handle 188.10 tapers in an upward direction 208 extending from stand 120.10 towards top 54.10 of storage container 42.10.

Figure 43:
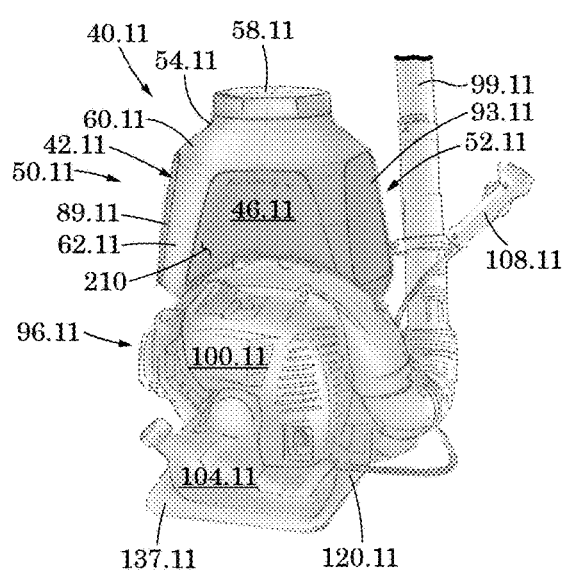
FIG. 43 is a front, left side perspective view of a backpack sprayer according to a twelfth aspect, with a blower unit pipe thereof shown in fragment.
Figure 44:
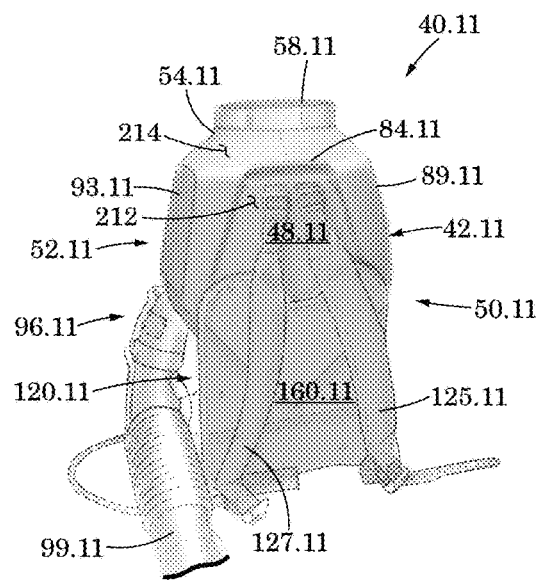
FIG. 44 is a rear, left side perspective view thereof, with a blower unit pipe thereof shown in fragment.

FIGS. 43 and 44 show a backpack sprayer 40.11 according to a twelfth aspect. Like parts have like numbers and functionings as backpack sprayer 40.2 shown in FIGS. 15 to 23 with decimal extension "0.11" replacing decimal extension "0.2" and being added to parts not previously having decimal numbers. Backpack sprayer 40.11 is similar to backpack sprayer 40.2 shown in FIGS. 15 to 23 with the following exceptions.

As seen in FIG. 43, backpack sprayer 40.11 has no side handles in this embodiment, though this is not strictly required. Front 46.11 of storage container 42.11 has a central portion 210 that is generally planar and an isosceles triangle in shape in this example. Referring to FIG. 44, rear 48.11 of the storage container has a central portion 212 that is generally planar and an isosceles triangle in shape in this example. Handle 84.11 is in the form of an elongate groove that extends horizontally between sides 50.11 and 52.11 of storage container 42.11 in this example. The handle is between central portion 212 of rear 48.11 of the storage container and tapered curved surface 214 of top 54.11 of the storage container.

Figure 45:
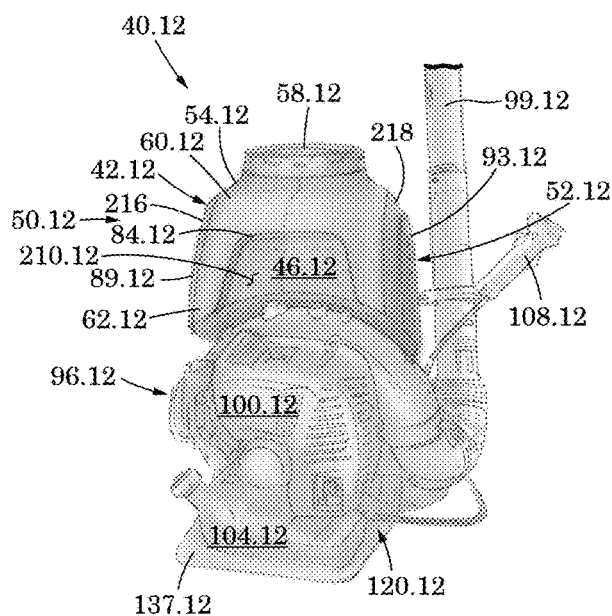
FIG. 45 is a front, left side perspective view of a backpack sprayer according to a thirteenth aspect, with a blower unit pipe thereof shown in fragment.
Figure 46:
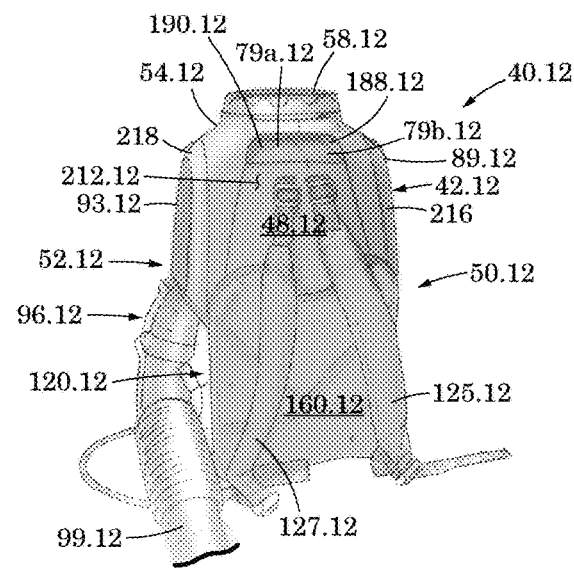
FIG. 46 is a rear, left side perspective view thereof, with a blower unit pipe thereof shown in fragment.

FIGS. 45 and 46 show a backpack sprayer 40.12 according to a thirteenth aspect. Like parts have like numbers and functionings as the backpack sprayer 40.11 shown in FIGS. 43 and 44 with decimal extension "0.12" replacing decimal extension "0.11" and being added for parts not previously having a decimal extension. Backpack sprayer 40.12 is similar to backpack sprayer 40.11 shown in FIGS. 43 and 44 with the following exceptions.

As seen in FIG. 45, storage container 42.12 includes a pair of arc-shaped portions 216 and 218 each enclosing respective side surfaces 89.12 and 93.12 thereof. Each arc-shaped portion is outwardly convex and upwardly facing in this example from the perspective of FIG. 45. Front 46.12 of the storage container has a central portion 210.12 that is recessed and an isosceles triangle in shape in this example. The front of the storage container, together with the recessed central portion of the front of the storage container, form central handle 84.12.

Referring to FIG. 46, handle 188.12 aligns with rear 48.12 of storage container 42.12 and includes a recessed portion 190.12. The recessed portion is an isosceles triangle in rear profile in this example. Handle 118.12 is adjacent removable lid 58.12 in this example.

Figure 47:
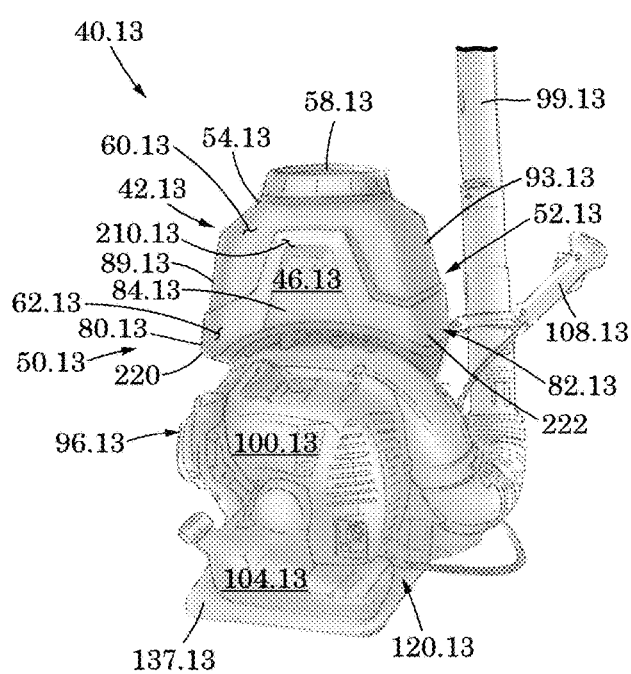
FIG. 47 is a front, left side perspective view of a backpack sprayer according to a fourteenth aspect, with a blower unit pipe thereof shown in fragment.
Figure 48:
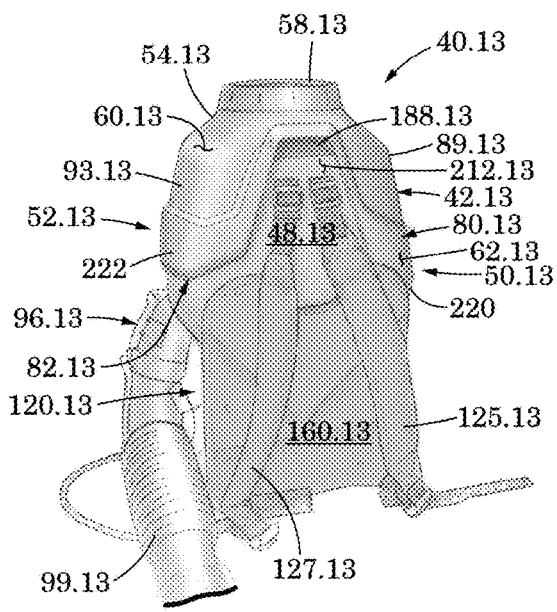
FIG. 48 is a rear, left side perspective view thereof, with a blower unit pipe thereof shown in fragment.

FIGS. 47 and 48 show a backpack sprayer 40.13 according to a fourteenth aspect. Like parts have like numbers and functionings as the backpack sprayer 40.12 shown in FIGS. 45 and 46 with decimal extension "0.13" replacing decimal extension "0.12" and being added for parts not previously having a decimal extension. Backpack sprayer 40.13 is similar to backpack sprayer 40.12 shown in FIGS. 45 and 46 with the following exceptions.

As seen in FIG. 47, lower portion 62.13 of storage container 42.13 extends laterally outwards relative to upper portion 60.13 of the storage container. The lower portion of the storage container forms outwardly extending protrusions 220 and 222 coupled to and extending outwards from side surface 89.13 and 93.13, respectively. The protrusions may comprise side handles 78.13 and 80.13 of storage container 42.13.

Central portion 210.13 of the storage container extends laterally outwards relative to upper portion 60.13 of the storage container. The central portion of storage container 42.13 is integrally connected to and formed with lower portion 62.13 of the storage container in this example so as to form a unitary whole. Central portion 210.13 of the storage container, together with the region of the lower portion of the storage container aligning therewith, form central handle 84.13 in this example.

Figure 49:
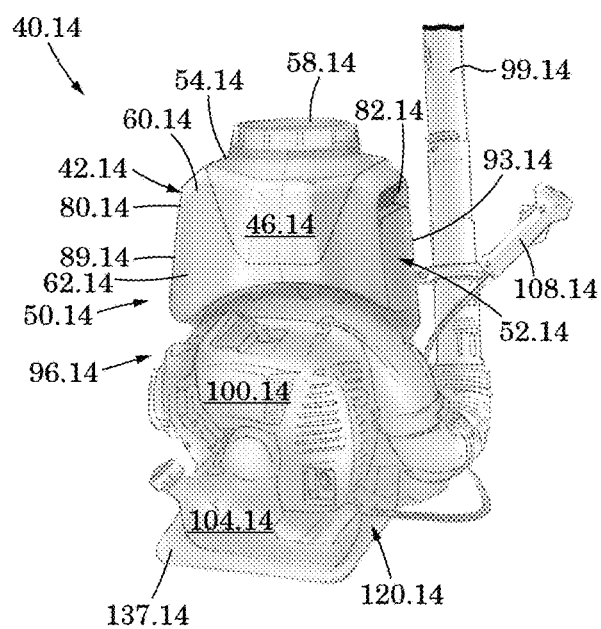
FIG. 49 is a front, left side perspective view of a backpack sprayer according to a fifteenth aspect, with a blower unit pipe thereof shown in fragment.
Figure 50:
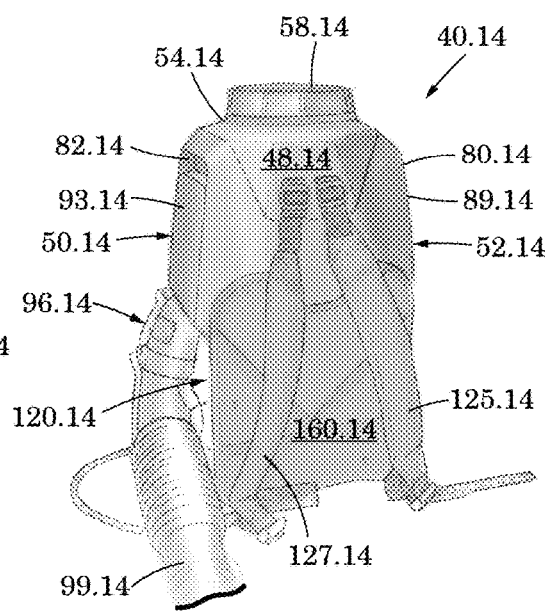
FIG. 50 is a rear, left side perspective view thereof, with a blower unit pipe thereof shown in fragment.

FIGS. 49 and 50 show a backpack sprayer 40.14 according to a fifteenth aspect. Like parts have like numbers and functionings as the backpack sprayer 40.2 shown in FIGS. 15 to 23 with decimal extension "0.14" replacing decimal extension "0.2" and being added to parts not previously having decimal numbers. Backpack sprayer 40.14 is similar to backpack sprayer 40.2 shown in FIGS. 15 to 23 with the exception that there are no central handles thereon.

Figures 51, 52:
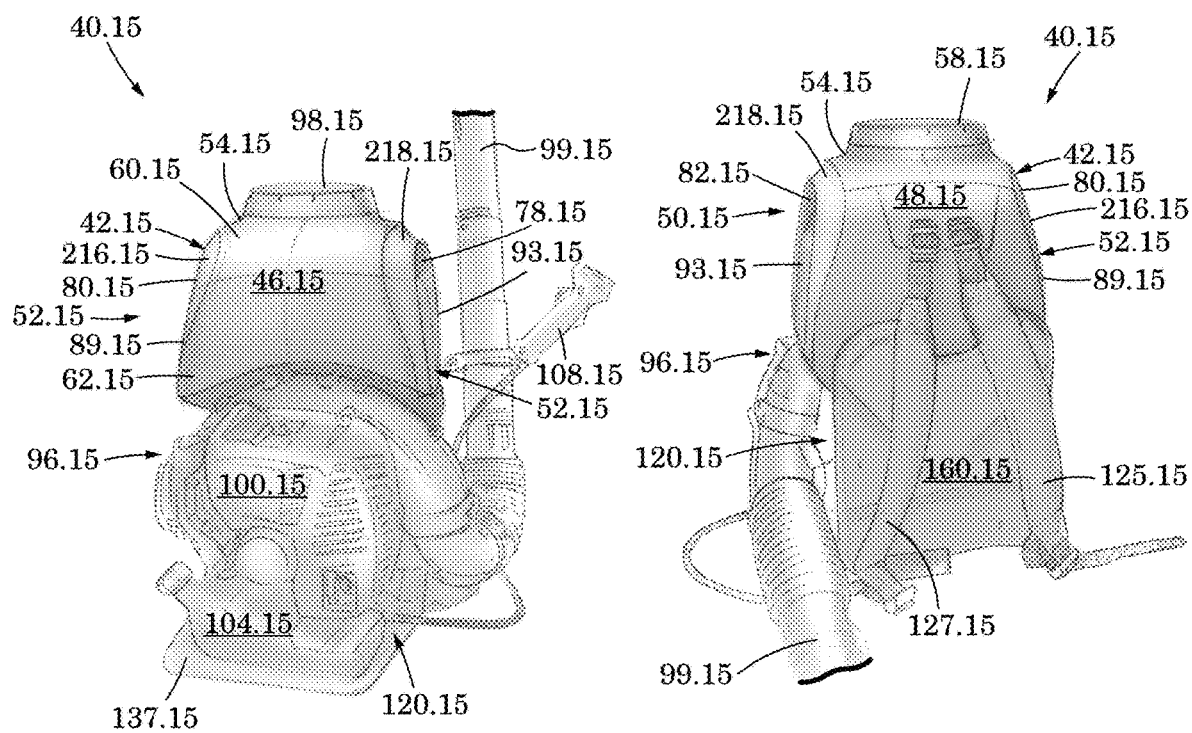
FIG. 51 is a front, left side perspective view of a backpack sprayer according to a sixteenth aspect, with a blower unit pipe thereof shown in fragment.
FIG. 52 is a rear, left side perspective view thereof, with a blower unit pipe thereof shown in fragment.

FIGS. 51 and 52 show a backpack sprayer 40.15 according to a sixteenth aspect. Like parts have like numbers and functionings as the backpack sprayer 40.12 shown in FIGS.

45 and 46 with decimal extension "0.15" replacing decimal extension "0.12" and being added to parts not previously having decimal numbers. Backpack sprayer 40.15 is similar to backpack sprayer 40.12 shown in FIGS. 45 and 46 with the following exceptions.

Side handles 78.15 and 80.15 are enclosed by arc-shaped portions 216.15 and 218.15. The arc-shaped portions are outwardly convex in side profile and outwardly concave at least in part in front and rear profile in this example. Front 46.15 of storage container 42.15 is continuous and outwardly convex in shape in this example. As seen in FIG. 52, backpack sprayer 40.15 has no central handles. The backpack sprayer has a rear 48.15 that is continuous and outwardly convex in shape in this example. Storage container 42.15 generally tapers from lower portion 62.15 thereof towards top 54.15 thereof in this example.

It will be appreciated that many variations are possible within the scope of the invention described herein.

Where a component (e.g. an apparatus, unit, assembly, device etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

"approximately" when applied to a numerical value means the numerical value±10%;

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;

in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

Additional Description

Examples of backpack sprayers have been described. The following clauses are offered as further description.
(1) A back-mounted spray apparatus comprising: a storage container shaped to receive therein liquid to be sprayed, the storage container including a pair of side handles integrally formed therewith and a central handle therebetween and integrally formed therewith; and a spraying assembly coupled to the storage container, with actuation thereof causing the liquid from the storage container to be selectively sprayed outwards therefrom.
(2) The apparatus of clause 1, or any subsequent or preceding clause herein, wherein the central handle is positioned rearwards of the side handles.
(3) The apparatus of any preceding or subsequent clause herein, wherein the central handle couples to and is integrally formed with the top of the storage container.
(4) The apparatus of any preceding or subsequent clause herein, wherein the central handle couples to and is integrally formed with the rear of the storage container.
(5) The apparatus of any preceding or subsequent clause herein, wherein the central handle couples to and is integrally formed with the front of the storage container.
(6) The apparatus of any preceding or subsequent clause herein, wherein the central handle extends outwards in part and upwards in part relative to the top of the storage container.
(7) The apparatus of any preceding or subsequent clause herein, wherein the central handle of the storage container extends substantially perpendicular to the side handles of the storage container.
(8) The apparatus of any preceding or subsequent clause herein, wherein positioning of the central handle of the storage container is fixed relative to positioning of the side handles of the storage container.
(9) The apparatus of any preceding or subsequent clause herein, wherein the handles of the storage container are rigidly coupled together and formed therewith.
(10) The apparatus of any preceding or subsequent clause herein, wherein the central handle includes a base which is angled relative to the top and the sides of the storage container.
(11) The apparatus of clause 10 or any preceding or subsequent clause herein, wherein the base is outwardly convex at least in part.
(12) The apparatus of clause 10 or any preceding or subsequent clause herein, wherein the central handle includes an elongate outer member and wherein the central handle tapers in a direction extending from the base to the elongate outer member.
(13) The apparatus of clause 11 or any preceding or subsequent clause herein, wherein the elongate outer member of the central handle extends perpendicular to the sides of the storage container.
(14) The apparatus of clause 11 or any preceding or subsequent clause herein, wherein the elongate outer member of the central handle extends perpendicular to the sides of the storage container.
(15) The apparatus of any preceding or subsequent clause herein, wherein the side handles include upper members which taper from the top of the storage container towards respective said sides of the storage container.
(16) The apparatus of any preceding or subsequent clause herein, wherein a first said side handle includes a hand-receiving receptacle which tapers in a direction extending from the top of the storage container towards a first said side and wherein a second said side handle includes a hand-receiving receptacle which tapers in a direction extending from the top of the storage container towards a first said side
(17) The apparatus of any one of clauses 1 to 12 or any preceding or subsequent clause herein, wherein each said side handle has an opening and an upper member which extends from the opening towards the top of the storage container, the upper member of the side handles being isosceles trapezoids in outer shape.
(18) The apparatus of any one of clauses 1 to 12 or any preceding or subsequent clause herein, wherein each said side handle has an opening and an upper member which extends from the opening towards the top of the storage container, the upper member of the side handles being isosceles trapezoids in outer shape.

(19) The apparatus of any one of clauses 1 to 11 or any preceding or subsequent clause herein, wherein the side handles have upper members which extend from the sides of the storage container towards the top of the storage container.

(20) The apparatus of any one of clauses 1 to 11 or any preceding or subsequent clause herein, wherein the side handles have upper members which are angled relative to the sides of the storage container and the top of the storage container.

(21) The apparatus of any one of clauses 1 to 11 or any preceding or subsequent clause herein, wherein the storage container has a longitudinal axis and tapers in directions extending from the longitudinal axis thereof towards the sides thereof

(22) The apparatus of any preceding or subsequent clause herein, wherein the storage container further including a pair of arc-shaped portions each enclosing a respective said side handle.

(23) The apparatus of clause 22, or any subsequent or preceding clause herein, wherein each said arc-shaped portion is outwardly concave at least in part.

(24) The apparatus of any of clauses 22 to 23, or any subsequent or preceding clause herein, wherein each said arc-shaped portion is outwardly convex at least in part.

(25) A back-mounted spray apparatus comprising: a backrest; a storage container shaped to receive therein liquid to be sprayed, the storage container coupling to the backrest and including a central handle integrally formed therewith and positioned between sides thereof, wherein the central handle aligns with or is below the top of the storage container and extends rearward a distance equal to less than that of the backrest; and a spraying assembly coupled to the storage container, with actuation thereof causing the liquid from the storage container to be selectively sprayed outwards therefrom.

(26) A back-mounted spray apparatus comprising: a storage container shaped to receive therein liquid to be sprayed, the storage container including an outwardly concave recessed portion positioned between sides thereof and including a central handle integrally formed therewith; and a spraying assembly coupled to the storage container, with actuation thereof causing the liquid from the storage container to be selectively sprayed outwards therefrom.

(27) A back-mounted spray apparatus comprising: a storage container shaped to receive therein liquid to be sprayed, the storage container including a first handle integrally formed with a front thereof and a second central handle integrally formed with a rear thereof; and a spraying assembly coupled to the storage container, with actuation thereof causing the liquid from the storage container to be selectively sprayed outwards therefrom.

(28) The apparatus of clause 27 or any preceding or subsequent clause herein, wherein the first handle aligns with or is recessed relative to the front of the storage container.

(29) The apparatus of any of clauses 27 to 28 or any preceding or subsequent clause herein, wherein the second handle aligns with or is recessed relative to the rear of the storage container.

(30) The apparatus of any of clauses 27 to 29 or any preceding or subsequent clause herein, wherein the first handle has a recessed portion that is triangular.

(31) The apparatus of clause 27 or any preceding or subsequent clause herein, wherein the first handle comprises an elongate protrusion integrally formed with and extending between the top and the front of the storage container.

(32) The apparatus of clauses 27 or 31 or any preceding or subsequent clause herein, wherein the second handle comprises an elongate protrusion integrally formed with and extending between the top and the rear of the storage container.

(33) The apparatus of any of clauses 31 to 32 or any preceding or subsequent clause herein, wherein each said handle extends between opposed sides of the storage container.

(34) The apparatus of any of clauses 31 to 33 or any preceding or subsequent clause herein, wherein the elongate protrusion of the first handle is integrally formed with and extends outwards from the opposed sides of the storage container.

(35) The apparatus of any of clauses 31 to 34 or any preceding or subsequent clause herein, wherein the elongate protrusion of the second handle is integrally formed with and extends outwards from the opposed sides of the storage container.

(36) A back-mounted spray apparatus comprising: a storage container shaped to receive therein liquid to be sprayed, the storage container including at least one central handle integrally formed with the top thereof adjacent to one of a front or rear thereof; and a spraying assembly coupled to the storage container, with actuation thereof causing the liquid from the storage container to be selectively sprayed outwards therefrom.

(37) The apparatus of clause 36, or any subsequent or preceding clause herein, wherein the handle includes a recessed portion that is an isosceles trapezoid in shape.

(38) The apparatus of any of clauses 36 to 37, or any subsequent or preceding clause herein, wherein the central handle aligns with and spans a distance equal to less than that of a removable lid of the storage container.

(39) The apparatus of any of clauses 36 to 38, or any subsequent or preceding clause herein, wherein the central handle aligns flush with the front or the rear of the storage container.

(40) The apparatus of any of clauses 36 to 39, or any subsequent or preceding clause herein, wherein the central handle comprises an elongate groove extending inwards from the front or the rear of the storage container.

(41) The apparatus of any preceding or subsequent clause herein, wherein the storage container includes a lower portion extending from the bottom thereof towards the top thereof and an upper portion extending from the top thereof towards the bottom thereof, and wherein the lower portion of the storage container extends laterally outwards relative to the upper portion of the storage container.

(42) A back-mounted spray apparatus comprising: a storage container shaped to receive therein liquid to be sprayed, the storage container including a pair of side handles integrally formed with respective sides thereof and a pair of arc-shaped portions each enclosing a respective said side handle; and a spraying assembly coupled to the storage container, with actuation thereof causing the liquid from the storage container to be selectively sprayed outwards therefrom.

(43) The apparatus of clause 42, or any subsequent or preceding clause herein, wherein each said arc-shaped portion is outwardly concave at least in part.

(44) The apparatus of any of clauses 42 to 43, or any subsequent or preceding clause herein, wherein each said arc-shaped portion is outwardly convex at least in part.

(45) A back-mounted spray apparatus comprising: a storage container shaped to receive therein liquid to be sprayed; and a frame member extending along a rear of the apparatus and to which the storage container couples, the frame member including a circular aperture extending therethrough.

(46) The apparatus of clause 45, or any subsequent or preceding clause herein, wherein the frame member is planar.

(47) The apparatus of any of clauses 45 to 46, or any subsequent or preceding clause herein, wherein the frame member has a width extending between sides thereof, and wherein the aperture has a diameter equal to or less than the width of the frame member.

(48) The apparatus of any of clauses 45 to 47, or any subsequent or preceding clause herein, wherein the frame member has an additional circular aperture extending therein.

(49) The apparatus of clause 48, or any subsequent or preceding clause herein, wherein the frame member has a longitudinal axis and wherein the apertures align with the longitudinal axis of the frame member.

(50) The apparatus of any of clauses 48 to 49, or any subsequent or preceding clause herein, wherein a lower said aperture of the frame member has a diameter which is larger than an upper said aperture of the frame member.

(51) A back-mounted spray apparatus comprising: a storage container shaped to receive therein liquid to be sprayed, the storage container having a lower or intermediate peripheral portion that is arc-shaped in a direction extending between sides thereof; a frame member extending along a rear of the apparatus and to which the storage container couples, the frame member having an aperture extending therethrough which is arc-shaped.

(52) The apparatus of clause 51, or any subsequent or preceding clause herein, wherein the aperture of the frame member extends about an axis and wherein the lower or front peripheral portion of the storage container curves about an axis which extends parallel to the axis of the aperture.

(53) The apparatus of any of clauses 51 to 52, or any subsequent or preceding clause herein, wherein the aperture of the frame member is arc-shaped in a direction extending between the sides of the storage container.

(54) The apparatus of any of clauses 51 to 53, or any subsequent or preceding clause herein, wherein the frame member is arc-shaped in side profile.

(55) The apparatus of any of clauses 51 to 54, or any subsequent or preceding clause herein, wherein the frame member is arc-shaped along a lower or front peripheral portion thereof.

(56) The apparatus of any of clauses 51 to 55, or any subsequent or preceding clause herein, wherein the frame member is arc-shaped along side peripheral portions thereof

(57) The apparatus of any of clauses 51 to 56, or any subsequent or preceding clause herein, wherein the aperture is circular.

(58) A back-mounted spray apparatus comprising: a frame comprising one or more vertical members and one or more horizontal members coupled to and cantilevered from the one or more vertical members; a storage container shaped to receive therein liquid to be sprayed, the storage container having a lower portion within an inwardly-facing channel shaped to receive and couple to the one or more horizontal members of the frame.

(59) The apparatus of clause 58, or any subsequent or preceding clause herein, wherein the one or more vertical members of the frame comprise a pair of spaced-apart side portions of the frame extending along the rear of the apparatus, and wherein the one or more horizontal members of the frame comprise an upper portion extending from the rear towards the front of the apparatus, the upper portion of the frame being cantilevered to and integrally formed with the side portions of the frame.

(60) The apparatus of clause 59, or any subsequent or preceding clause herein, wherein the storage container has an upper portion which extends overtop of the upper portion of the frame, and wherein the lower portion of the storage container encloses and couples to the upper portion of the frame.

(61) The apparatus of any of clauses 58 to 60, or any subsequent or preceding clause herein, further including or more fasteners actuation thereof further couple the frame to the storage container.

(62) The apparatus of any of clauses 58 to 61, or any subsequent or preceding clause herein, wherein the front and the sides of the storage container are shaped to enclose the one or more horizontal members of the frame.

(63) The apparatus of any of clauses 58 to 62, or any subsequent or preceding clause herein, wherein the front and the sides of the storage container are shaped to cover the one or more horizontal members of the frame when the apparatus is viewed from the sides and the front thereof.

(64) The apparatus of any of clauses 58 to 63, or any subsequent or preceding clause herein, wherein the frame further includes a horizontally-extending stand spaced-apart from and couple to the one or more horizontal members thereof via the one or more vertical members thereof.

(65) The apparatus of any preceding clause or any other clause herein, wherein the storage container is octagonal in top profile.

(66) A back-mounted spray apparatus comprising: a storage container shaped to receive therein liquid to be sprayed, the storage container including a front, a rear spaced-apart from the front thereof, first and second sides extending between the front thereof and the rear thereof, a first angled surface extending between the first side thereof and the front thereof, a second angled surface extending between the second side thereof and the front thereof, a third angled surface extending between the first side thereof and the rear thereof, and a fourth angled surface extending between the second side thereof and the rear thereof; and a spraying assembly coupled to the storage container, with actuation thereof causing the liquid from the storage container to be selectively spray outwards therefrom.

(67) The apparatus of clause 66, or any subsequent or preceding clause herein, wherein the front of the storage container is an isosceles trapezoid in shape.

(68) The apparatus of any of clauses 66 to 67, or any subsequent or preceding clause herein, further including a first side handle formed by the first side, the first angled surface and the third angled surface of the storage container, and including a second side handle formed by the second side, the second angled surface and the fourth angled surface of the storage container.

(69) The apparatus of any one of clauses 67 to 68, or any subsequent or preceding clause herein, further including a fifth angled surface extending between the top and a first side of the storage container, and a sixth angled surface extending between the top and a second side of the storage container.

(70) The apparatus of clause 68, or any subsequent or preceding clause herein, further including a fifth angled surface extending between the top and a first side of the storage container, the fifth angled surface being part of the first side handle, and further including a sixth angled surface extending between the top and a second side of the storage container, the sixth angled surface being part of the second side handle.

(71) The apparatus of any one of clauses 69 to 70, or any subsequent or preceding clause herein, wherein the fifth angled surface is an isosceles trapezoid in shape and wherein the sixth angled surface is an isosceles trapezoid in shape.

(72) The apparatus of any one of clauses 69 to 71, or any subsequent or preceding clause herein, further including a seventh angled surface extending between the top and the rear of the storage container, the seventh angled surface being positioned between the sides of the storage container.

(73) The apparatus of clause 72, or any subsequent or preceding clause herein, further including a central handle coupled to and integrally formed with the rear of the storage container, the seventh angled surface being part of said central handle.

(74) A back-mounted spray apparatus comprising: a storage container shaped to receive therein liquid to be sprayed, the storage container including handle means integrally formed with and coupled thereto; and a spraying assembly coupled to the storage container, with actuation thereof causing the liquid from the storage container to be selectively spray outwards therefrom.

(75) A storage container for a back-mounted spray apparatus, the storage container being according to any of the preceding clauses.

(76) A method of forming a storage container for a back-mounted spray apparatus, the method comprising: forming a handle via a handle mold; enclosing the handle so formed within a block assembly having one or more exterior surfaces which are outwardly convex; positioning the block assembly within a container mold; and blow injecting material into the container mold.

(77) The method of clause 76, or any subsequent or preceding clause herein, wherein within the forming the handle step, forming the handle to include a pair of spaced-apart end portions and an elongate portion extending therebetween.

(78) The method of clause 77, or any subsequent or preceding clause herein, wherein the end portions of the handle extend at least in part outwards from the block assembly and couple with the material during the blow injecting step.

(79) The method of clause 77, or any subsequent or preceding clause herein, wherein the end portions of the handle include one or more protrusions which extend outwards from the block assembly and which melt and integrally couple with the material during the blow injecting step.

(80) The method of any one of clauses 76 to 79, or any subsequent or preceding clause herein, wherein the one or more exterior surfaces of the block assembly extend between the end portions of the handle.

(81) The method of any one of clauses 76 to 80, or any subsequent or preceding clause herein, further including within the blow injecting step, blow injecting the material into the container mold so as to coat an interior surface thereof and an exterior surface of the block assembly.

(82) Apparatus including any new and inventive feature, combination of features, or sub-combination of features as described herein.

(83) Methods including any new and inventive steps, acts, combination of steps and/or acts or sub-combination of steps and/or acts as described herein.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A back-mounted spray apparatus having a front and a rear spaced-apart from the front thereof, the apparatus comprising:

a storage container shaped to receive therein liquid to be sprayed, the storage container having a front aligned with the front of the apparatus, the storage container having a rear spaced-apart from the front thereof and aligned with the rear of the apparatus, the storage container having first and second sides each extending between the front and rear thereof, and the storage container having a top extending from adjacent the first side to adjacent the second side thereof and extending from the front thereof to the rear thereof;

a centrally-positioned removable lid threadably coupled to the top of the storage container, the removable lid being positioned between the front and rear of the storage container and being positioned between the first and second sides of the storage container;

a centrally-positioned handle coupled to and extending outwards from the storage container, wherein the centrally-positioned handle is positioned along the rear of the storage container, wherein the centrally-positioned handle extends up to or below the top of the storage container, wherein the centrally-positioned handle extends up to or inwards from the rear of the apparatus, and wherein the centrally-positioned handle is rearwards of and aligns with the removable lid; and a spraying assembly coupled to and aligning with the front of the storage container, the spraying assembly including a fan unit and a motor operatively connected thereto, with actuation of the spraying assembly causing the liquid from the storage container to be selectively sprayed outwards therefrom.

2. A back-mounted spray apparatus according to claim 1, wherein the centrally-positioned handle is spaced below the removable lid.

3. A back-mounted spray apparatus according to claim 1, wherein the storage container includes a central body, and wherein the central body of the storage container includes a recessed portion with the centrally-positioned handle coupling to or being adjacent the recessed portion of the storage container.

4. A back-mounted spray apparatus according to claim 1, wherein the centrally-positioned handle is integrally formed with the rear of the storage container.

5. A back-mounted spray apparatus according to claim 1, including a first said centrally-positioned handle integrally formed with the front of the storage container and a second said centrally-positioned handle integrally formed with the rear of the storage container.

6. A back-mounted spray apparatus according to claim 1, including a pair of side handles, each aligning flush with a respective said side of the storage container.

7. A back-mounted spray apparatus according to claim 1, wherein the apparatus includes a frame comprising one or more vertical members and one or more horizontal members coupled to and cantilevered from the one or more vertical members, and wherein the storage container includes a lower portion with an inwardly-facing channel shaped to receive and couple to the one or more horizontal members of the frame.

8. A back-mounted spray apparatus according to claim 1, wherein the storage container tapers in side and front profile at least in part in a direction extending from a bottom thereof towards the top thereof.

9. A back-mounted spray apparatus according to claim 1, wherein the storage container includes a first angled surface extending between the first side thereof and the front thereof, a second angled surface extending between the second side thereof and the front thereof, a third angled surface extending between the first side thereof and the rear thereof, and a fourth angled surface extending between the second side thereof and the rear thereof.

10. A back-mounted spray apparatus according to claim 1, wherein the storage container including a pair of side handles, each integrally formed with a respective said side thereof.

11. A back-mounted spray apparatus according to claim 1, wherein the storage container has a lower or front peripheral portion that is arc-shaped in a direction extending between the first and second sides thereof.

12. A back-mounted spray apparatus according to claim 3, wherein the recessed portion of the central body of the storage container is outwardly concave at least in part.

13. A back-mounted spray apparatus according to claim 3, wherein the recessed portion of the central body of the storage container is outwardly convex at least in part.

14. A back-mounted spray apparatus according to claim 1, including a pair of side handles each extending inwards from a respective said side of the storage container.

15. A back-mounted spray apparatus according to claim 1, wherein the storage container includes a pair of side handles and a pair of arc-shaped portions each enclosing at least in part a respective said side handle.

16. A back-mounted spray apparatus having a front and a rear spaced-apart from the front thereof, the apparatus comprising:
a storage container shaped to receive therein liquid to be sprayed, the storage container having a front aligned with the front of the apparatus, the storage container having a rear spaced-apart from the front thereof and aligned with the rear of the apparatus, the storage container having first and second sides each extending between the front and rear thereof, and the storage container having a top extending from adjacent the first side to adjacent the second side thereof and extending from the front thereof to the rear thereof;
a centrally-positioned removable lid threadably coupled to the top of the storage container, the removable lid being positioned between the front and rear of the storage container and being positioned between the first and second sides of the storage container;
a centrally-positioned handle coupled to and extending outwards from the storage container, wherein the centrally-positioned handle is positioned along the rear of the storage container, wherein the centrally-positioned handle extends up to or below the top of the storage container, and wherein the centrally-positioned handle is rearwards of and aligns with the removable lid;
a spraying assembly coupled to and aligning with the front of the storage container, the spraying assembly including a fan unit and a motor operatively connected thereto, with actuation of the spraying assembly causing the liquid from the storage container to be selectively sprayed outwards therefrom; and
a frame member extending along the rear of the apparatus and to which the storage container couples, wherein the centrally-positioned handle aligns with the frame member.

17. A back-mounted spray apparatus having a front and a rear spaced-apart from the front thereof, the apparatus comprising:
a storage container shaped to receive therein liquid to be sprayed, the storage container having a front aligned with the front of the apparatus, the storage container having a rear spaced-apart from the front thereof and aligned with the rear of the apparatus, the storage container having first and second sides each extending between the front and rear thereof, the storage container having a top extending from adjacent the first side to adjacent the second side thereof and extending from the front thereof to the rear thereof, the storage container including a central body, the storage container including a pair of side handles each positioned along a respective said side thereof, and the storage container including a central handle positioned along the rear of the storage container and between the side handles thereof, wherein each said handle is at least in part positioned inwards within the central body of the storage container;
a centrally-positioned removable lid threadably coupled to the top of the storage container, the removable lid being positioned between the front and rear of the storage container and being positioned between the first and second sides of the storage container, wherein the central handle is rearwards of and aligns with the removable lid; and
a spraying assembly coupled to and aligning with the front of the storage container, the spraying assembly including a fan unit and a motor operatively connected thereto, with actuation of the spraying assembly causing the liquid from the storage container to be selectively sprayed outwards therefrom.

18. A back-mounted spray apparatus according to claim 16, wherein the centrally-positioned handle is positioned above the frame member.

19. A back-mounted spray apparatus according to claim 16, wherein the apparatus includes a pair of backpack straps coupled to the frame member, and wherein the centrally-positioned handle aligns with and is positioned above said pair of backpack straps.

20. A back-mounted spray apparatus according to claim 17, wherein the central handle includes an elongate outer member which extends perpendicular to the first and second sides of the storage container.

\* \* \* \* \*